United States Patent
Park et al.

(10) Patent No.: US 10,338,638 B2
(45) Date of Patent: Jul. 2, 2019

(54) WEARABLE SMART DEVICE

(71) Applicant: LG ELECTRONICS INC., Seoul (KR)

(72) Inventors: Kyoungjoon Park, Seoul (KR); Wonseok Joo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/762,385

(22) PCT Filed: Nov. 20, 2015

(86) PCT No.: PCT/KR2015/012533
§ 371 (c)(1),
(2) Date: Mar. 22, 2018

(87) PCT Pub. No.: WO2017/051980
PCT Pub. Date: Mar. 30, 2017

(65) Prior Publication Data
US 2018/0275715 A1    Sep. 27, 2018

(30) Foreign Application Priority Data
Sep. 23, 2015 (KR) .......... 10-2015-0134511

(51) Int. Cl.
*G06F 1/16* (2006.01)
*H05K 5/00* (2006.01)
*H05K 7/00* (2006.01)

(52) U.S. Cl.
CPC ............ *G06F 1/163* (2013.01); *G06F 1/16* (2013.01); *G06F 1/1652* (2013.01); *G06F 1/1656* (2013.01)

(58) Field of Classification Search
CPC .......... G06F 1/16; G06F 1/163; G06F 1/1652; G06F 1/1656
USPC .............. 361/679.21–679.3, 679.55, 679.56, 361/679.03, 679.02, 679.01
See application file for complete search history.

(56) References Cited

U.S. PATENT DOCUMENTS

| | | | |
|---|---|---|---|
| 9,510,470 B2 * | 11/2016 | Huitema | G06F 1/1652 |
| 9,594,402 B2 * | 3/2017 | Hiroki | G06F 1/163 |
| 2009/0251419 A1 | 10/2009 | Radely-Smith | |
| 2013/0044215 A1 | 2/2013 | Rothkopf et al. | |
| 2015/0015502 A1 | 1/2015 | Al-Nasser | |
| 2015/0054728 A1 | 2/2015 | Choi et al. | |

FOREIGN PATENT DOCUMENTS

WO    WO 2013/089392 A1    6/2013

* cited by examiner

*Primary Examiner* — Anthony M Haughton
(74) *Attorney, Agent, or Firm* — Birch, Stewart, Kolasch & Birch, LLP

(57) ABSTRACT

Disclosed is a wearable smart device which a user can conveniently and comfortably wear. The present application may provide a wearable smart device comprising: a flexible display unit; a first frame which supports the flexible display unit and is restorably deformed to have a first curvature to allow the wearable smart device to be worn on a user's body; and a second frame which is restorably deformed to have a second curvature larger than the first curvature and is movably coupled to the first frame to allow the second frame to move relatively with the respect to the first frame while the second frame is deformed, wherein the second frame is configured to adjust the amount of deformation of the wearable smart device.

20 Claims, 12 Drawing Sheets

(a)

(b)

(c)

(a)

(b)

(a)

(b)

(a)

(b)

WEARABLE SMART DEVICE

CROSS REFERENCE TO RELATED APPLICATIONS

This application is the National Phase of PCT International Application No. PCT/KR2015/012533, filed on Nov. 20, 2015, which claims priority under 35 U.S.C. 119(a) to Patent Application No. 10-2015-0134511, filed in the Republic of Korea on Sep. 21, 2015, all of which are hereby expressly incorporated by reference into the present application.

TECHNICAL FIELD

The present specification relates to a smart device including a mobile terminal, and more particularly, to a smart device capable of being worn on a wrist of a user.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs. In order to perform the aforementioned functions, basically, a mobile terminal is connected with different devices or a network using various communication protocols and may be able to provide ubiquitous computing environment to a user. In particular, the mobile terminal is evolving to a smart device enabling connectivity to a network and ubiquitous computing.

Conventionally, the smart device as the mobile terminal has been manufactured by a size capable of being held by a hand of a user and the user used to carry the smart device by hand or put in a bag or a pocket. Yet, with technological advances, the smart device is manufactured by a smaller size and is evolving to a wearable device directly worn on a body of a user.

A wearable smart device basically provides a lot more merits to a user in carrying the wearable smart device. Yet, for more convenient and comfortable wearing of the smart device, it is still required to have many improvements in the wearable device.

DISCLOSURE OF THE INVENTION

Technical Task

Accordingly, the present specification is directed to an apparatus and method thereof that substantially obviate one or more problems due to limitations and disadvantages of the related art. An object of the present specification is to provide a wearable smart device capable of being conveniently and comfortably worn on a user.

Technical Solution

To achieve these and other advantages and in accordance with the purpose of the present invention, as embodied and broadly described, according to one embodiment, a wearable smart device includes a flexible display unit, a first frame configured to support the flexible display unit and the first frame configured to be recoverably deformed to have first curvature to be worn on a body of a user, and a second frame configured to be recoverably deformed to have second curvature greater than the first curvature and the second frame configured to be movably coupled with the first frame to relatively move for the first frame while being deformed. In this case, the second frame is configured to control an amount of deformation of the wearable smart device.

The flexible display unit is attached to the first frame and can be recoverably deformed with the first curvature together with the first frame. And, the first frame can be configured by a body of a long plate shape.

The second frame can form a space to accommodate components for driving the wearable smart device. The second frame can be arranged at a position closer to a user compared to the first frame and the second frame can be arranged at the below of the first frame. And, the second frame can be slidably coupled with the first frame and the second frame can outwardly move more in a length direction compared to the first frame while being deformed. More specifically, the wearable smart device can further include a slot provided to one of the first frame and the second frame, and a protrusion provided to another one of the first frame and the second frame to be coupled with the slot and the protrusion capable of moving along the slot.

An amount of deformation of the second frame can be configured to be controlled to control the amount of deformation of the wearable smart device. The second frame can include a plurality of links connected with each other. The second frame can be configured to control an angle between the links to control the amount of deformation of the wearable smart device. More specifically, the second frame can be configured to control an amount of friction at a connection part of the links to control an angle between the links.

The second frame is arranged at a connection part that connects a pair of links adjacent to each other and can include a friction member to apply friction force to the connection part. The friction member can apply different friction force to the connection part while being deformed with a different size according to a size of external force. More specifically, the second frame can include a hinge axis configured to connect links adjacent to each other, a first member configured to be movably installed according to the center of the hinge axis, and a second member configured to apply friction force to the links in a manner of being elastically deformed by the first member while the first member is moving.

The wearable smart device can further include a gasket configured to fill a clearance between the first frame and the second frame in a manner of being installed between the first frame and the second frame. The gasket is arranged between a side of the first frame and a side of the second frame facing the first frame and can be configured to cover a side of the display unit installed on the first frame.

The wearable smart device can further include a cover installed in an end part of the second frame and the cover configured to wrap an end part of the display unit. The cover can be configured to make the end part of the display unit slide on the cover. The wearable smart device can further include a secondary cover installed between the cover and the end part of the display unit and the secondary cover configured to slide on the cover together with the end part of the display unit while the wearable smart device is deformed.

The wearable smart device can further include a sensing mechanism configured to sense deformation of the wearable smart device. The wearable smart device can further include a filler installed in one of both ends of the wearable smart device facing each other when the wearable smart device is deformed and the filler configured to fill a gap between the both ends.

Advantageous Effects

According to the present specification, a second frame is movably coupled with a first frame to enable the second frame to perform relative movement for the first frame. Hence, when the wearable smart device is worn on a user, the second frame, which is adjacent to the user, can form smooth curvature and a curved surface while being deformed with relatively big curvature. For this reason, since the first and the second frames provide structural stability by the coupling and form the smooth curvature and the curved surface via the relative movement, the user can comfortably wear the wearable smart device.

And, the second frame consists of links connected with each other and may have a control mechanism capable of controlling an angle between links adjacent to each other. The control mechanism can be configured to control the amount of friction at a connection unit that connects the links. The second frame can control an angle between links using the control mechanism. Moreover, the second frame can control not only the amount of deformation of the second frame but also the amount of deformation of a device by controlling an angle between links using the control mechanism.

Moreover, when the first and the second frames are worn on a user, the first and the second frames can be easily deformed with curvature matched with the user using the control mechanism. Hence, the user can conveniently wear the wearable smart device and can wear the wearable smart device for a long time due to the convenient wearing sensation.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE FOR INVENTION

Figure 1:
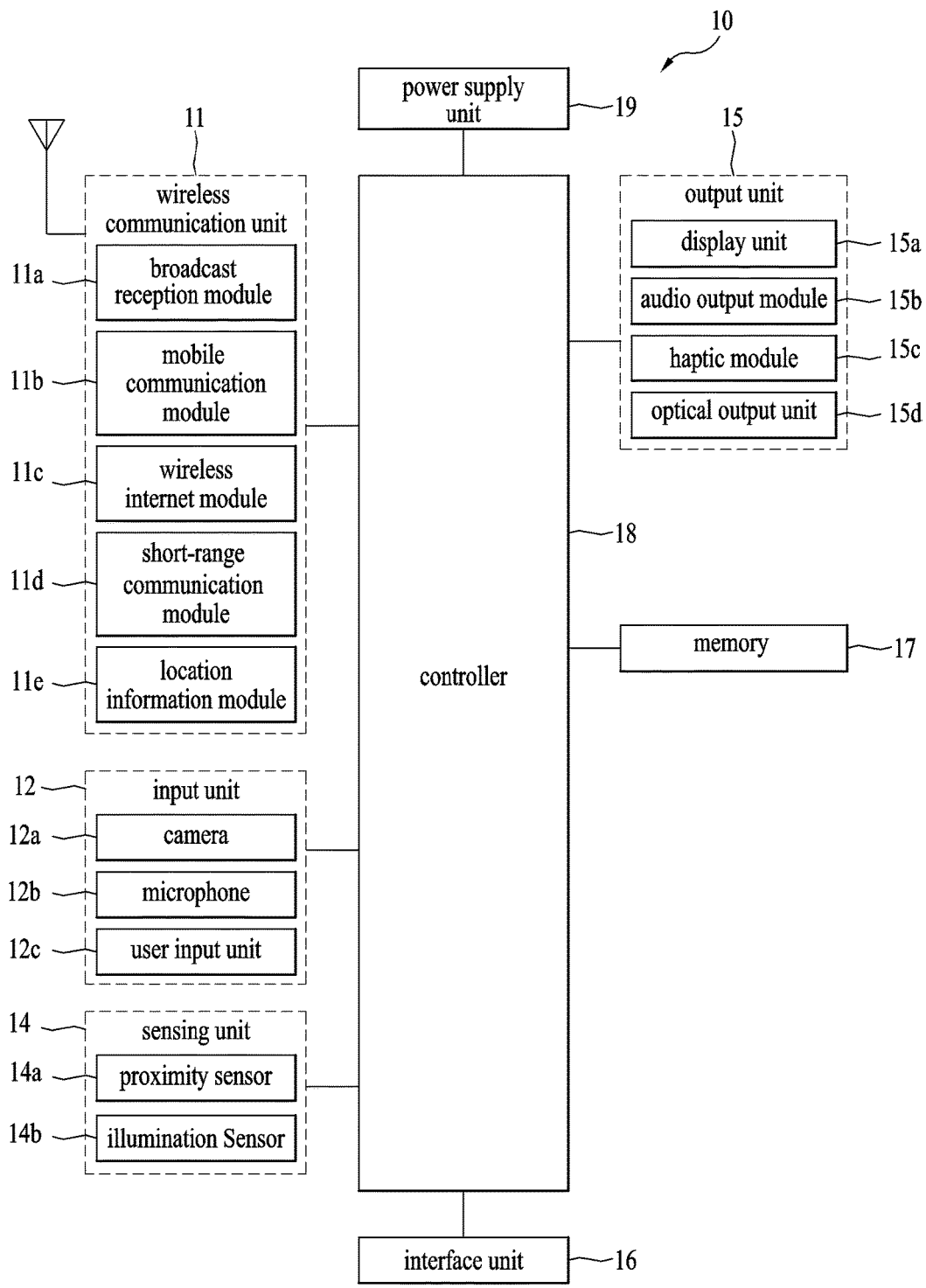
FIG. 1 is a block diagram for a configuration of a wearable smart device related to the present specification.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "comprise", "include" or "has" are used herein and should be understood that they are intended to indicate an existence of several components, functions or steps, disclosed in the specification, and it is also understood that greater or fewer components, functions, or steps may likewise be utilized. And, for the same reason, it should be construed as the present specification also includes a combination where a partial characteristic, a number, a step, an operation, a configuration element, a part and the like are omitted from a combination of characteristic, a number, a step, an operation, a configuration element, a part and the like explained by the aforementioned terminology, unless the present specification deviates from an intention of an original invention disclosed in the present specification.

A smart device described in the present specification can include a cellular phone, a smartphone, a laptop computer, a digital broadcasting terminal, a PDA (personal digital assistants), a PMP (portable multimedia player), a navigation, a slate PC, a tablet PC, an ultra-book, a wearable device (e.g., a terminal of watch-type (a smartwatch), a terminal of glass-type (a smart glass), a HMD (head mounted display) and the like.

Yet, those skilled in the art can easily understand that a configuration according to embodiments of the present specification can also be applied to a different general smart device except a case that the configuration is applicable to a wearable smart device only.

FIG. 1 is a block diagram for a configuration of a wearable smart device related to the present invention. A general configuration of a wearable smart device is explained with reference to FIG. 1 in the following.

The wearable smart device 10 can include a wireless communication unit 11, an input unit 12, a detection unit 14, an output unit 15, an interface unit 16, a memory 17, a controller 18, a power supply unit 19 and the like. Since configuration elements shown in FIG. 1 are not mandatory for implementing the wearable smart device, the wearable smart device described in the present specification may have configuration elements more or less than the aforementioned configuration elements. Further, all of these elements are not specifically shown in other drawings, and only the important elements are shown in the drawings other than FIG. 1. However, the person skilled in the art would understand that at least the elements of FIG. 1 can be included in the wearable smart device in order to realize the function as the smart device, although all of these elements are not shown in the other drawings.

More specifically, among the configuration elements, the wireless communication unit 11 can include one or more modules enabling wireless communication to be performed between the wearable smart device 10 and a wireless communication system, between the wearable smart device 10 and a different smart device 10 or between the wearable smart device 10 and an external server. And, the wireless communication unit 11 can include one or more modules configured to connect the wearable smart device 10 with one or more networks.

The wireless communication unit 11 can include at least one selected from the group consisting of a broadcast reception module 11a, a mobile communication module 11b, a wireless internet module 11c, a short-range communication module 11d and a location information module 11e.

The input unit 12 includes a camera 12a or an image input unit for obtaining an image signal, a microphone 12b or an audio input unit for inputting an audio signal, and a user input unit 12c (for example, a touch key, a push key (a mechanical key), and the like) for allowing a user to input information. Audio data or image data is obtained by the input unit 12 and may be analyzed and processed by a control command of a user.

The sensing unit 14 can include one or more sensors to sense at least one selected from the group consisting of information of the wearable smart device, environment information surrounding the wearable smart device and user information. For instance, the sensing unit 140 can include at least one selected from the group consisting of a proximity sensor 14a, an illumination sensor 14b, a touch sensor, an acceleration sensor, a magnetic sensor, a gravity sensor (G-sensor), a gyroscope sensor, a motion sensor, an RGB sensor, an infrared sensor (IR sensor), a finger recognition sensor (finger scan sensor), a ultrasonic sensor, an optical sensor (e.g., a camera (refer to 12a)), a microphone (refer to 12b), a battery gauge, an environment sensor (e.g., a barometer, a hygrometer, a thermometer, a radioactivity detection sensor, a heat detection sensor, a gas detection sensor etc.), and a chemical sensor (e.g., an electronic nose, a healthcare sensor, a biometric sensor etc.). Meanwhile, the wearable smart device disclosed in the present specification can be utilized by combining information sensed by two or more sensors among the aforementioned sensors with each other.

The output unit 150 is used to generate an output related to a sense of vision, a sense of hearing and a sense of tactile. The output unit can include at least one selected from the group consisting of a display unit 15a, an audio output unit 15b, a haptic module 15c and an optical output unit 15d. The display unit 15a can implement a touch screen in a manner of forming a layer structure with a touch sensor or forming an integrated body with the touch sensor. The touch screen functions as a user input unit 12c providing an input interface between the wearable smart device 10 and a user and may also be able to provide an output interface between the wearable smart device 10 and the user.

The interface unit 16 performs a role of a path to an external device of various types connected with the wearable smart device 10. The interface unit 16 can include at least one selected from the group consisting of a wired/wireless headset port, an external charger port, a wired/wireless data port, a memory card port, a port used for connecting a device on which an identification module is mounted, an audio I/O (input/output) port, a video I/O (input/output) port, and an earphone port. The wearable smart device 10 can perform an appropriate control related to an external device connected with the interface unit 16 when the external device is connected with the interface unit.

The memory 17 stores data supporting various functions of the wearable smart device 10. The memory 17 can store a plurality of application programs (or applications) drivable in the wearable smart device 10, data for an operation of the wearable smart device 10, and commands. At least a part of the application programs can be downloaded from an external server via radio communication. And, at least a part of the application programs may exist in the wearable smart device 10 from the timing of manufacturing the wearable smart device 10 for a basic function (e.g., making a call, receiving a call, receiving a message, sending a message) of the wearable smart device 10. Meanwhile, an application program is stored in the memory 17, is installed in the wearable smart device 10 and is driven to make an operation (or function) of the wearable smart device to be performed by the controller 18.

The controller 18 typically functions to control overall operation of the wearable smart device 10, in addition to the operations associated with the application programs. The controller 18 may provide or process information or functions appropriate for a user by processing signals, data, information and the like, which are inputted or outputted by the aforementioned various configuration elements or activating application programs stored in the memory 17.

The controller 18 controls at least a part of the configuration elements shown in FIG. 1 to drive an application program stored in the memory 17. Moreover, the controller 18 can make the wearable smart device 10 drive in a manner of combining at least two or more configuration elements included in the wearable smart device 10 with each other to drive the application program.

The power supply unit 19 can be configured to receive external power or provide internal power in order to supply appropriate power to each of the configuration elements included in the wearable smart device 10 under a control of the controller 18. The power supply unit 19 may include a battery 19*a* (refer to FIG. 4), and the battery 19*a* may be configured to be embedded in the wearable smart device, or configured to be detachable from the wearable smart device.

At least a part of the configuration elements can cooperate with each other to implement an operation, a control and a method of controlling the wearable smart device according to various embodiments described in the following. The operation, the control and the method of controlling the wearable smart device can be implemented in the wearable smart device 10 in a manner of driving at least one or more application programs stored in the memory 17.

The wearable smart device 10 is depicted as a device including a type, i.e., a watch-type or a bracelet-type capable of being worn on a body, i.e., a wrist of a user in the following drawings, by which the present invention may be non-limited. The present invention can also be applied to various structures including a necklace type, a ring type, and the like. In particular, a configuration of a specific type of the wearable smart device 10 and explanation on the configuration can be generally applied not only to the specific type of the wearable smart device 10 but also to a wearable smart device 10 of a different type.

Figure 2:
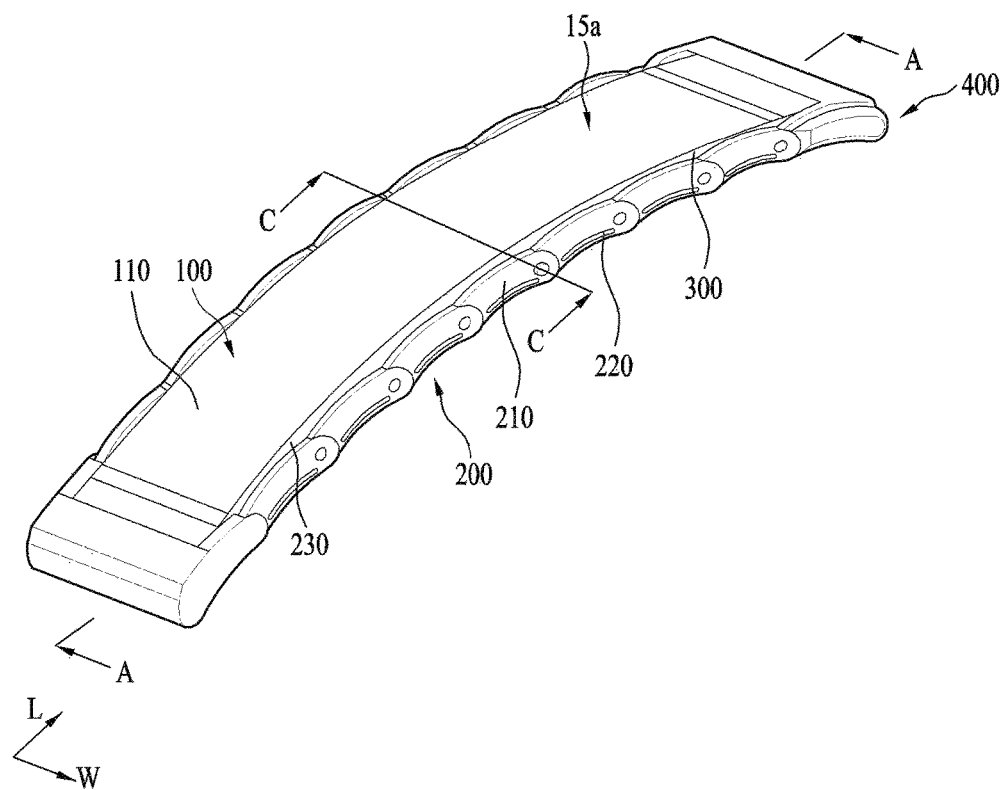
FIG. 2 is a perspective diagram for an example of a wearable smart device.
Figure 3:
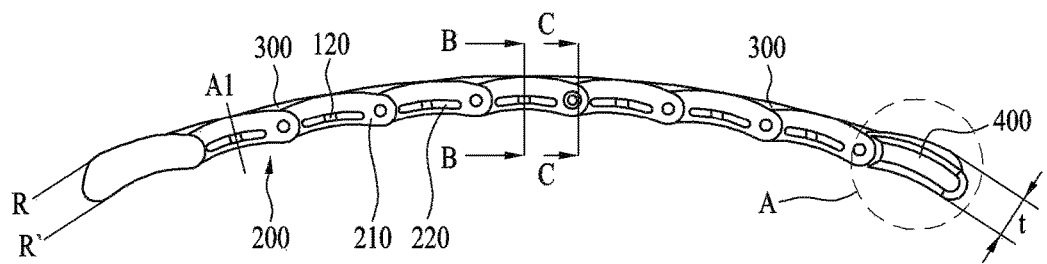
FIG. 3 is a side view diagram for an example of a wearable smart device.
Figure 4:
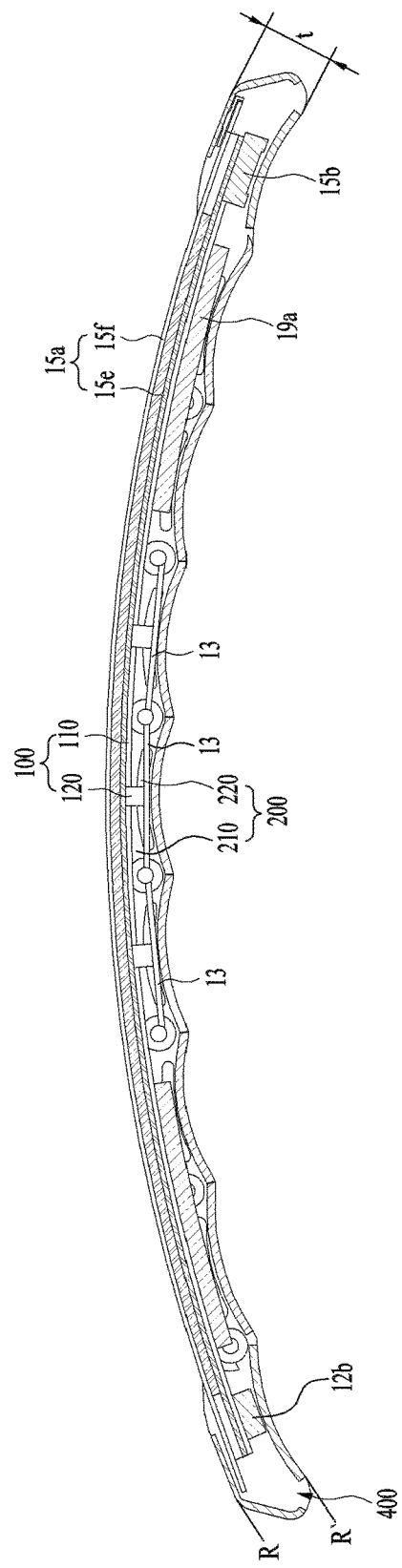
FIG. 4 is a cross section diagram for an example of a wearable smart device obtained according to A-A line shown in FIG. 1.

Further to the explanation for a general configuration of the aforementioned wearable smart device 10 (hereinafter, device), an overall structure of the wearable smart device 10 is schematically explained with reference to a related drawing in the following. Regarding this, FIG. 2 is a perspective diagram for an example of a wearable smart device, FIG. 3 is a side view diagram for the example of the wearable smart device, FIG. 4 is a cross section diagram for an example of a wearable smart device obtained according to A-A line shown in FIG. 1. Since FIGS. 2 to 4 show an overall structure of the device 10, all explanations of the present specification basically refer to FIGS. 2 to 3 unless a reference drawing is specially mentioned.

As shown in FIG. 2 and FIG. 4, the wearable smart device 10 can include frames 100/200 that form the exterior of the wearable smart device. The frames 100/200 are depicted in the remaining drawings in detail and can be explained as a frame assembly consisting of two frames 100/200. Basically, the frames 100/200 can be configured to support various electronic components required to drive the wearable smart device 10. And, the frames 100/200 can be configured to form a space accommodating the electronic components. As mentioned in the foregoing description, since the frames 100/200 form the exterior of the device 10, the frames can protect the electronic components embedded in the frames. The electronic components embedded in the frames 100/200 are depicted in FIG. 4 in more detail.

Referring to FIG. 4, the wearable smart device 10 can include the display unit 15*a* as the output unit 15. The display unit 15*a* can be exposed from the device 10 to make the display unit 15*a* to be easily seen to a user in a state of being worn on the user. The display unit 15*a* can be supported by the frames 100/200. The exposed display unit 15*a* can form the exterior of the wearable smart device 10 together with the frames 100/200. The display unit 15*a* can provide various informations to a user. More specifically, the display unit 15*a* can display information processed by the wearable smart device 10. For instance, the display unit 15*a* basically outputs various images and text information and may be able to display information on an execution screen of an application program executed in the wearable smart device 10, UI (user interface) according to the information on the execution screen or information on GUI (graphic user interface). More specifically, the display unit 15*a* can inform a user of current time among various informations capable of being displayed. In order to display the current time, the display unit 15*a* may directly display numbers corresponding to the current time or may display a dial (or, face) and hands like an analog watch does. In particular, the display unit 15*a* and other electronic components related to the display unit can implement an electronic and virtual watch in a smart watch.

The display unit 15*a* can include at least one selected from the group consisting of an LCD (liquid crystal display), a TFT LCD (thin film transistor-liquid crystal display), an OLED (organic light-emitting diode), a flexible display, a 3D display, and an E-ink display. And, two or more display units can be provided to the wearable smart device 10 if necessary. For instance, an additional display may be provided to a bottom part of the device 10 opposite to an upper part of the display unit 15*a* in FIG. 4 to make the additional display to be exposed to a user in a position opposite to a position of the display unit 15*a* in the drawing.

The display unit 15*a* can include a display module 15*e* and a window 15*f* covering the display module 15*e*. The display module 15*e* can be made of such a display element as the aforementioned LCD or the OLED. The display module corresponds to a configuration element actually displaying picture information. The window 15*f* can be arranged at a part exposed to a user of the display module 15*e* and may be able to protect the display module 15*e* from the external. The window 15*f* not only performs the protection function but also allows a user to see information displayed on the display module 15*e*. Hence, the window 15*f* can be made of a material of proper hardness and transparency. In particular, the window 15*f* may function as glass or crystal member in a general watch. If the window 15*f* is made of a transparent material only, not only the display module 15*e* but also a different part or internal components of the wearable smart device 10 can be exposed to a user. The exposure may degrade the appearance of the device 10. Hence, it may be preferable to configure a part of the window 15*f* to be opaque except a prescribed area of the window configured to expose picture information of the display module 15*e*. More specifically, an opaque layer can be applied or attached to an edge part surrounding the display module 15*e* in a rear side of the window 15*f*. The opaque layer can be called as a bezel. As shown in FIG. 4, the display module 15*e* can be directly attached to the rear side of the window 15*f*. The display module 15*e* can be directly attached to the window 15*f* in various ways and adhesive can be most conveniently used to directly attach the display module to the window.

The display unit 15*a* can include a touch sensor (not depicted) configured to detect a touch inputted on the display unit 15*a* to receive a control command input inputted by a touch scheme. If a touch is inputted on the display unit 15*a*, the touch sensor detects the touch and the controller 18 can be configured to generate a control command corresponding to the touch based on the touch. Contents inputted by the touch scheme may correspond to a text, a number or a menu item capable of being indicated or designated in various modes. Meanwhile, the touch sensor is configured by a film form including a touch pattern and can be arranged between the window 15f and the display module 15e. Or, the touch sensor may correspond to a metal wire directly patterned on the rear side of the window 15f. Or, the touch sensor can be integrated with the display module 15e. For instance, the touch sensor may be arranged on a board of the display module 15e or can be installed in the inside of the display module 15e. As mentioned in the foregoing description, the display unit 15a can form a touch screen together with the touch sensor. In this case, the touch screen may function as the user input unit 12c (refer to FIG. 1). In some cases, a physical key (e.g., a push key) can be additionally provided to a position adjacent to the display unit 15a, which is a touch screen, for a convenient input of a user as the user input unit 12c. The display module 15f is represented as a plurality of layers (i.e., a module consisting of components or an assembly) in the attached drawings according to a complex configuration of the display module 15f.

The wearable smart device 10 can also include an audio output module 15b installed in the inside of the wearable smart device. The audio output module 15b can be implemented by a receiver delivering a calling signal to an ear of a user. And, a loud speaker can be installed in the wearable smart device 10 as an additional audio output module to output various alarm sounds and playback sound of multimedia. And, the wearable smart device 10 can include a microphone 12b installed in the inside of the wearable smart device. The microphone 12b can input not only voice of a user but also different sounds to the device 10. The audio output module 15b and the microphone 12b can be supported or accommodated by the frames 100/200. More specifically, when a phone call is made using the wearable smart device 10, the audio output module 15b can be installed in the wearable smart device 10, more specifically, in one of length direction (L) end points of the frames 100/200 to make the audio output module to be arranged near an ear of a user. Similarly, when a phone call is made, the microphone 12b can be installed in the wearable smart device 10, more specifically, in one of length direction end points of the frames 100/200 to make the microphone to be arranged near a mouth of a user. In particular, the audio output module 15b and the microphone 12b can be installed in the wearable smart device 10, more precisely, in the length direction end points of the frames 100/200, respectively, opposite to each other. The arrangement of the audio output module 15b and the microphone 12b shall be explained later in more detail together with relevant configuration elements.

The wearable smart device 10 can also include a board 13 in the inside of the wearable smart device. The board 13 corresponds to a configuration element in which various electronic components, i.e., various processors constructing the controller 18, are installed together with a different circuit and elements assisting the processors. The board can be installed in a body 100, i.e., a case 110. Although it is not depicted in detail, each of the configuration elements depicted in FIG. 1 can be directly installed in the board 13 to be controlled by the controller 18 or can be electronically connected with the board 13 in a manner of being installed in the inside of the case 110. For example, the controller 180 can receive a touch sensed by a touch sensor of the window 15e or a command inputted by the input unit 12c. The controller 18 can control various components including the display module 15f based on the received command. Hence, the controller 180 can be referred to as various names such as a controller, a controlling device, and the like. The controller 18 can control a smart watch 100 and all configuration elements of the smart watch. The configuration elements controlled by the controller include not only the configuration elements shown in FIG. 1 but also other configuration elements to be described later.

Moreover, the wearable smart device 10 can include a battery 19a (refer to FIG. 1) as a power supply unit 19 configured to supply power. The battery 19a may be configured to be embedded in the device 10 (built-in) or may be configured to be detachable from the device 10. The battery 19a can be charged via a power cable connected to a terminal installed in the device 10. And, the battery 19a can be configured to be charged in wireless via a wireless charger. The wireless charging can be implemented by a magnetic induction scheme or a resonance scheme (magnetic resonance scheme). As shown in the drawing, both the board 13 and the battery 19a can be supported or accommodated by the frames 100/200.

Figure 8:
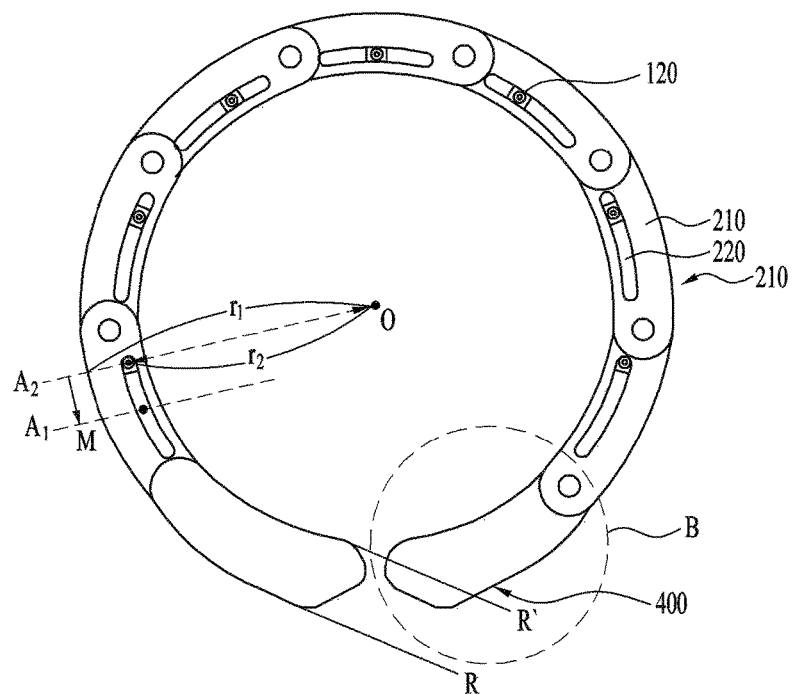
FIG. 8 is a side view diagram for an example of a wearable smart device deformed to be worn on a body of a user.

Along with the aforementioned various components, the wearable smart device 10 can be worn on a body of a user. The wearable smart device 10 can be configured to be worn on the body, in particular, a wrist of the user as a watch or a bracelet. Since the wrist of the user includes big curvature, as shown in FIG. 8, the wearable smart device 10 is also configured to have big curvature to make the device to be twined around the wrist. In order to deform the wearable smart device 100, deformation of both an appearance and a frame of the wearable smart device is basically required. Hence, frames 100/200 forming the appearance and the frame can be configured to be actually deformed to have big curvature. Meanwhile, since the most part of the wearable smart device 10 is deformed to be worn on the body of the user, it is necessary to deform big components in addition to the frames 100/200. If the wearable smart device 10 includes a mechanism capable of maintaining or controlling a deformed state, as shown in FIG. 8, a user can continuously wear the device 10 after changing the device 10 in accordance with a curvature of a body part preferred by the user. On the other hand, the wearable smart device 10 can include a coupling mechanism installed in length direction (L) both ends of the wearable smart device 10. After the wearable smart device 10 is deformed, the length direction both ends of the device 10 can be connected with each other by the coupling mechanism and a user can continuously wear the device 10.

Meanwhile, in order to take off the wearable smart device 10, it is necessary for the device 10 to be restored to a previous state or to be unfolded at least. Hence, the wearable smart device 10 can be configured to be restored to an original state. Practically, the frames 100/200 forming an appearance and a frame of the wearable smart device can be configured to be restored to an original state. In consideration of the aforementioned deformation and restoration, the wearable smart device 10, in particular, the frames 100/200 can be configured to be deformed with prescribed curvature to make the device to be restored. Hence, the frames 100/200 can be made of such a material including flexibility and elasticity of a certain level as metal or plastic for restorable deformation, i.e., elastic bending.

In relation to overall deformation of the wearable smart device 10, it is also necessary to consider deformation or arrangement of internal components. First of all, as shown in the drawing, the display unit 15a may have a big size to conveniently provide more information to a user and the display unit can be extended over length direction (L) of the device 10 to have the big size. Hence, in addition to the device 10, the display unit 15*a* can also be configured to be recoverably deformed. More specifically, the display unit 15*a*, in particular, the module 15*e* and the window 15*f* can be configured by a flexible display, which is made of such a transformable material as plastic. On the other hand, since it is necessary for the board 13 to support the considerable number of components, the board should be made of a material having strength and stiffness of an appropriate level. However, since it is difficult to deform the board 13 made of the material, as shown in FIG. 4, the board can be divided to a plurality of parts not to interrupt the deformation of the device 10. The structure of the board 13 shall be explained later in detail with reference to FIG. 16. Meanwhile, since a battery 19*a* does not require strength and stiffness as much as those required by the board 13, the battery 19*a* can be manufactured by a flexible material. Hence, in order to supply sufficient power to the wearable smart device 10, the battery 19*a* can be manufactured to have a big size and can be recoverably deformed together with the device 10. In order to efficiently use a space in the device 10, the battery of the big size can be arranged at a plane identical to a plane of the board 13 belonging to the left part and the right part of the deformable part of the device 10. Although the audio output module 15*b* and the microphone 12*b* are unable to be deformed, the audio output module 15*b* and the microphone 12*b* have a very small size. Hence, the audio output module 15*b* and the microphone 12*b* can be arranged at both ends of length direction (L) of the wearable smart device 10, respectively, where deformation does not occur.

As mentioned in the foregoing description, the wearable smart device 10 is deformed, i.e., is bent or folded, to have big curvature fitting to a wrist of a user and can be worn on the wrist of the user. And, the device 10 can be taken off from the wrist of the user in a manner of being restored to an original state, i.e., in a manner of being unfolded. Moreover, as shown in FIGS. 2 and 3, if the device 10 is completely restored, i.e., if the device 10 is completely unfolded, the device may have a bar form. In particular, if the wearable smart device 10 is taken off from the wrist of the user, the device may have such a shape as a mobile terminal corresponding to a general smart device. Hence, if necessary, the user takes off the wearable smart device 10 from the wrist of the user and may be then able to use the device as a general mobile terminal. As a representative example, the user may take off the wearable smart device 10 from the wrist of the user and may be then able to make a call while holding the device by a hand. Hence, if the user brings the completely unfolded wearable smart device 10 to a face of the user while holding the device by a hand, the audio output module 15*b* and the microphone 12*b* can be closely arranged at an ear and a mouth of the user, respectively and the user can conveniently make a phone call. Basically, when the wearable smart device 10 is worn on the user in a manner of being deformed, the wearable smart device can perform all functions, e.g., communication and multimedia functions, of a smart device, i.e., all functions of a mobile terminal.

Meanwhile, in case of the wearable smart device 10 configured to repeat deformation and restoration while the wearable smart device is used, the frames 100/200 should repeat deformation and restoration together with various components which are accommodated or supported by the frames. Hence, it is necessary to design the frames 100/200 in consideration of the aforementioned functions. The frames 100/200 are explained in detail with reference to related drawings in the following.

Figure 5:
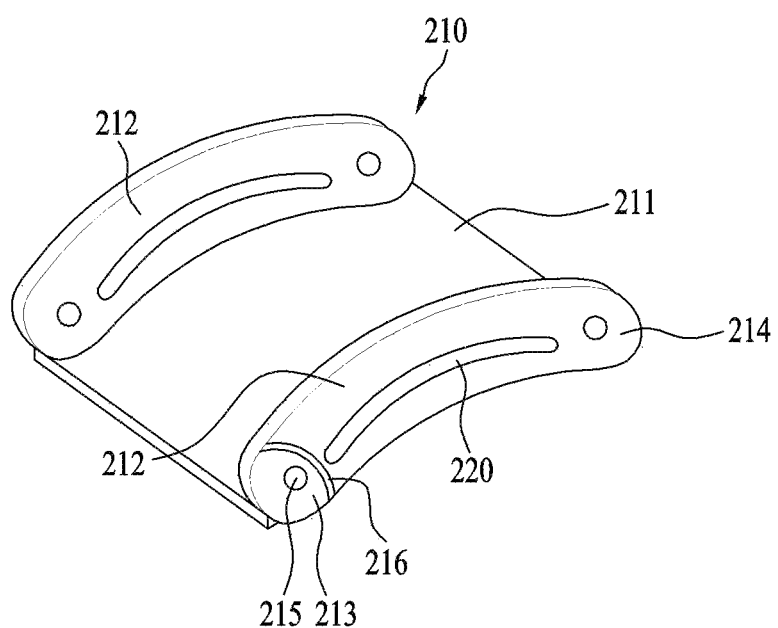
FIG. 5 is a perspective diagram for a link member of a second frame included in the example of the wearable smart device shown in FIG. 2.
Figure 6:
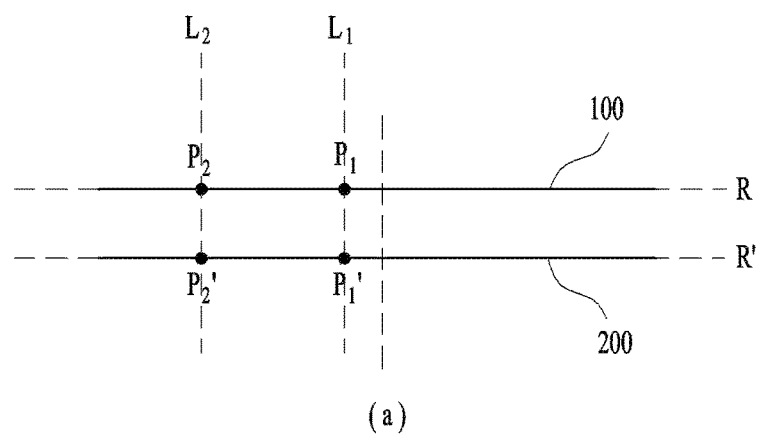
FIG. 6 is a schematic diagram for a relation between deformed first and second frames.
Figure 6:
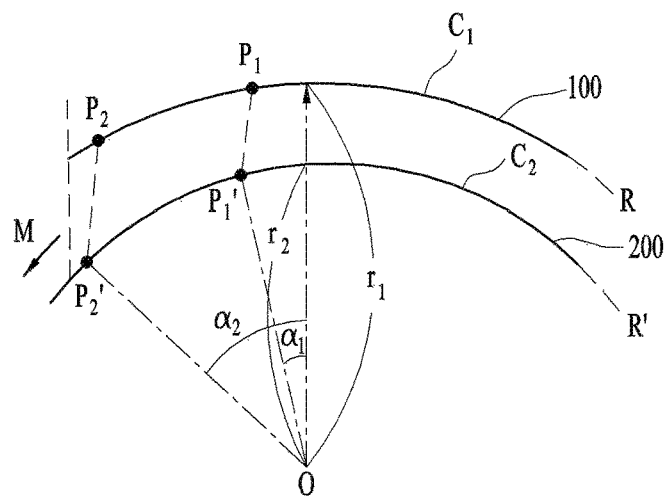
Figure 6:
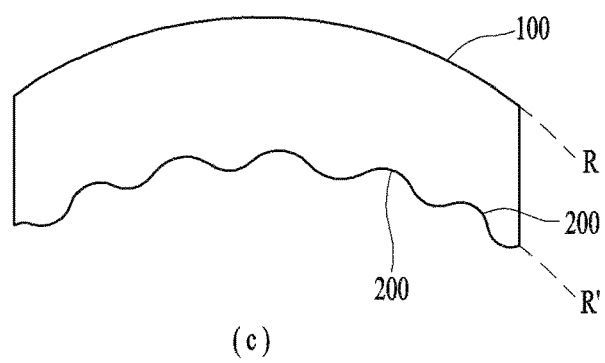
Figure 7:
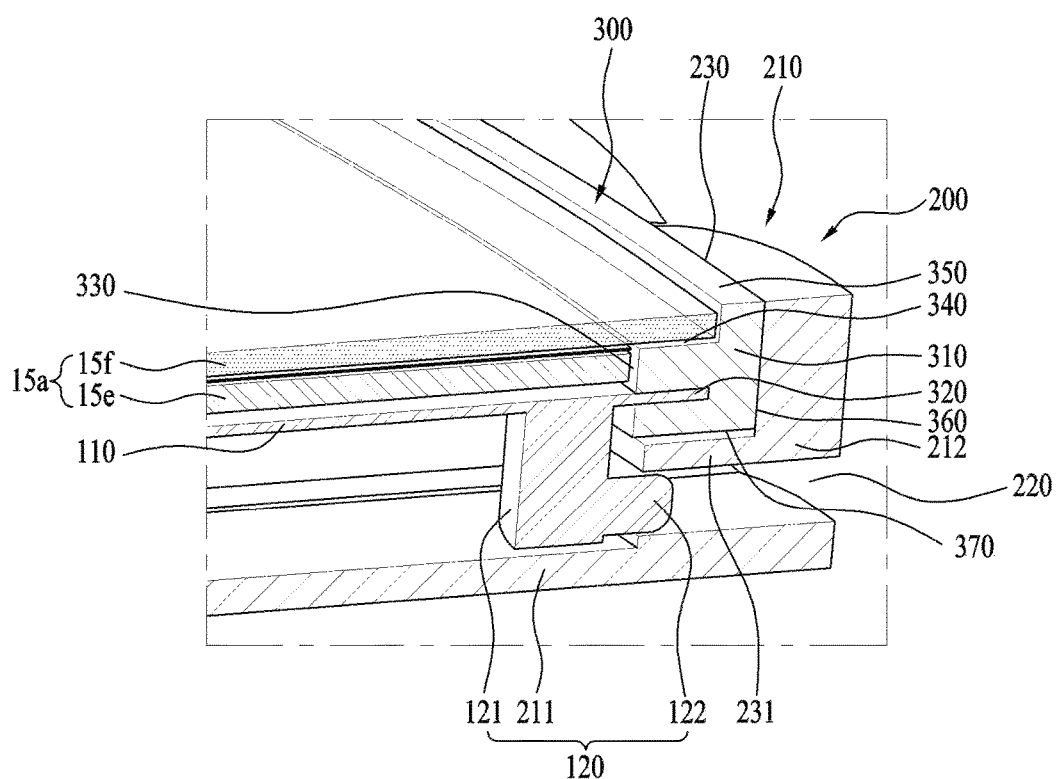
FIG. 7 is a cross section diagram for an example of a wearable smart device obtained according to B-B line shown in FIG. 3.

FIG. 5 is a perspective diagram for a link member of a second frame included in the example of the wearable smart device shown in FIG. 2. FIG. 6 is a schematic diagram for a relation between deformed first and second frames. FIG. 7 is a cross section diagram for an example of a wearable smart device obtained according to B-B line shown in FIG. 3. FIG. 8 is a side view diagram for an example of a wearable smart device deformed to be worn on a body of a user. As mentioned in the foregoing description, since the frames 100/200 are exposed to the external of the device 10 to form the exterior of the device 10, FIGS. 2 to 4 can illustrate the frames 100/200 of the wearable smart device 10. In particular, it may basically refer to FIGS. 2 to 4 in addition to FIGS. 5 to 8 in explaining the frames 100/200.

First of all, FIGS. 3 and 4 illustrate outermost/innermost planes (R, R') of the frames 100/200 before the frames are deformed. Not only FIGS. 3 and 4, but also FIG. 2 illustrates the device 10 having a certain curvature to show each part well. Yet, the device 10 can be practically extended with a straight line. In particular, as shown in FIG. 6 (*a*), an outermost plane (R) and an innermost plane (R') may be flat without being bent. In contrast with the planes (R, R') before the frames are deformed, FIG. 8 illustrates actual radial outermost/innermost planes (R, R') after the frames are deformed.

As mentioned earlier in FIGS. 3 and 4, since the frames 100/200 support or accommodate various components, an assembly of the frames may have a considerable size, in particular, a considerable thickness (t). The frames 100/200 are deformed together with the wearable smart device 10 with big curvature to be worn on a wrist of a user. Due to the considerable thickness of the deformed frames 100/200, there may exist a big difference between curvature/radius curvature of radial outermost plane (R) and curvature/radius curvature of innermost plane (R') in the assembly of the deformed frames 100/200. The difference of the curvature/radius curvature may bring a result that deformation of one plane among the planes (R/R') restricts deformation of another plane. Meanwhile, as mentioned earlier in FIGS. 3 and 4, each of the frames 100/200 can include an outermost plane (R) and an innermost plane (R'), respectively, in consideration of the structural arrangement of the frames 100/200. Hence, if the frames 100/200 are formed by a single member constructed by a continuous body, it may interrupt the frames 100/200 from being deformed with a preferred big curvature. For this reason, the wearable smart device 10 can be configured by a first and a second frame 100/200 consisting of a plurality of members different from each other. The frames 100/200 may form a single frame assembly to support and accommodate components. In case of deforming the frame assembly, a mutual relation between the first frame 100 and the second frame 200 shall be explained in detail with reference to FIG. 8. As mentioned in the foregoing description, since the first and the second frame 100/200 repeat deformation and restoration, the frames can be configured to be recoverably deformed to have a prescribed curvature. Hence, the first and the second frames 100/200 can be made of such a material including flexibility and elasticity of a certain level as metal or plastic for restorable deformation, i.e., elastic bending.

First of all, as mentioned in the foregoing description, when the first frame 100 is deformed to have curvature, the first frame can be structurally arrange at a radial outermost, i.e., the outermost plane (R). In particular, the first frame 100 can be arranged in the vicinity of the display unit 15a which is exposed to the external of the wearable smart device 10. Hence, the first frame 100 can be basically configured to support the display unit 15a. More specifically, in order to support the display unit 15a, which is extended in a length direction of the wearable smart device, the first frame 100 can be configured by a long plate member, which is also extended in the length direction of the wearable smart device 10, i.e., a body 110 corresponding to a member of a strip shape. Since the first frame has the body 110 of the strip shape, the first frame 100 may have a length sufficient enough for being stably twined around a body of a user after the device is deformed. As shown in FIG. 4, the display unit 15a, specifically, the display module 15e can be put on the first frame 100 (i.e., the body 110), in particular, the display unit can be attached to the first frame 100 (i.e., the body 110). And, the window 15f can be put on the display module 15e, in particular, the window can be attached to the display module 15e. Hence, due to stacking and attachment of the display module 15e and the window 15f stacked and attached on the first frame 100, the display unit 15a can be attached to the first frame 100 while being supported by the first frame 100. The display module 15e and the window 15f can be attached in various methods. As a simple method, the display module 15e and the window 15f can be attached using an adhesive. Due to the attachment, the display unit 15a and the first frame 100 are formed as a single body. Hence, the display unit 15a and the first frame 100 can be configured to be recoverably deformed together.

As shown in FIGS. 2 and 4, although the first frame 100 can be configured by a solid body 110, it may be required to have relatively more power to deform the solid body 110. Hence, although it is not depicted, the first frame 100 can include at least one or more notches 111 to easily deform the first frame. Power required when the first frame 100 is deformed to have curvature, i.e., power required when the first frame is elastically bent may be affected by a direction orthogonal to a length direction (L) of the first frame 100, i.e., a cross section of a width direction (W). If the cross section of the width direction (W) is reduced, much less power may be required for the same deformation. Hence, in order to reduce the cross section of the width direction (W), the notch can be extended according to the width direction (W) of the first frame 100. And, for easier deformation, it may be preferable to form a plurality of notches on the first frame 100. Since a plurality of the notches are formed in width direction (W), although it is not depicted, in order to provide a plurality of the notches to the first frame 100, a plurality of the notches are arranged according to the length direction (L) of the first frame 100 and can be separated from each other with a prescribed space along the length direction (L). Moreover, when a shape of the first frame 100, i.e., a plate shape of the first frame is considered, a notch is unable to be formed over the whole of the width direction of the first frame 100. Hence, the notch is inwardly extended from one side of the first frame 100, specifically, one side parallel to the length direction (L) of the first frame 100 and the notch may not reach to another side of the first frame. If the notch is arranged at one side only of the first frame 100, it may be difficult for the first frame 100 to be uniformly deformed. Hence, as shown in the drawing, the notch can be alternately assigned to both sides of the first frame 100.

The second frame 200 is configured to functionally accommodate components of the wearable smart device 10. As shown in the drawing, the second frame 200 can include a plurality of links 210 connected with each other. The links can form a body of the second frame 200 that forms a space structurally accommodating the components. Each of a plurality of the links has an internal space which is formed in the inside of the link. When the links are connected with each other, each of the internal spaces is also connected with each other to form a single big space. In particular, the links connected with each other can form a container that forms a single big space. For instance, a board 13, a battery 19a and the like can be accommodated in the internal space formed by the links 210. And, the links 210 connected with each other form a body of the second frame 200 having a shape of a long strip. In particular, similar to the first frame 100, the second frame 200 may have a length sufficient enough for being twined around a body of a user after the deformation.

More specifically, as shown in FIG. 5, the link 210 can include a bottom unit 211 and side walls 212 provided to both sides of the bottom unit 211. The side walls are separated from each other with a prescribed space. Hence, the link 210 can form an internal space formed by the side walls 212 and the bottom unit 211. In particular, the link 210 may become a practical member of a channel shape due to the side walls 212 and the bottom unit 211. A first hinge 213 is formed at one end of the side wall 211 in a length direction and a second hinge 214 can be formed at another end of the side wall. The first hinge 213 can be pivotably connected with the second hinge 214 of an adjacent link 210 via a hinge axis 215. Hence, the links 210 can be configured to be pivotably connected with each other. For this reason, the second frame 200 can be more smoothly deformed with bigger curvature compared to the first frame 100. And, a recess 216 of a prescribed size can be formed at the first hinge 213. The second hinge 214 coupled with the first hinge 213 can be accommodated in the recess 216. Hence, the second hinge 214 may not be protruded from the first hinge 213, i.e., the side wall 212 of the link. For this reason, the links coupled with each other, i.e., the second frame 200, may have a smooth side surface and the exterior of the device 10 can also be enhanced.

In order to secure an accommodation space in the wearable smart device 10, the second frame 200, i.e., a bottom part of the second frame can be separated from the first frame 100 with a prescribed space. In particular, the second frame 200 can be arranged at the below of the first frame 100 or a lower part of the device 10. Since the lower part of the device 10 is adjacent to a wrist of a user, it may be explained as the second frame 200 is arranged at a position closer to the user compared to the first frame 100. Moreover, when the device 10 is worn on a body of a user, the second frame 200 can be configured to be directly contacted with the body of the user. Consequently, the second frame 200 forms a prescribed accommodation space and the first frame 100 may play a role in closing the formed accommodation space while supporting the display unit 15a. Hence, when the device is deformed to have curvature, at least a part of the second frame 200 can be structurally arranged at a radial innermost, i.e., the innermost plane (R'). Hence, curvature and curvature of radius of the second frame 200 deformed at the innermost plane (R') may differ from curvature and curvature of radius of the first frame 100 deformed at the outermost plane (R).

Since the second frame 200 has a body 210 of a container shape due to the links 210 connected with each other, as shown in FIGS. 2 and 7, the second frame 200 can also accommodate the first frame 100 together with the display unit 15a. More specifically, since the links 210 have a channel shape including an opened top, the second frame 200 may have a long opening 230 formed by the connection of opened tops of the links 210. And, the first frame 100 and the display unit 15*a* can be inserted into the second frame 200 via the opening 230. Hence, the display unit 15*a* and the first frame 100 can be more stably installed in the wearable smart device 10 together with other components. As mentioned in the foregoing description, both the display module 15*e* and the window 15*f* of the display unit 15*a* can be firstly supported by the first frame 100. Yet, in order to more stably support the display unit 15*a*, the display unit 15*a* can be additionally supported by the second frame 200. In addition to the display unit 15*a*, a body 110, i.e., the first frame 100, can also be supported by the second frame 200. More specifically, the second frame 200 can include a seating part 231 configured to support the display unit 15*a*. Since a prescribed inner peripheral surface is relatively formed on a body 210 near the opening 230 (i.e., a side wall 212 of the link 210) due to the formation of the opening 230, the seating part 231 can be inwardly extended from the second frame or the inner peripheral surface of the body 210 (i.e., the side wall 212 of the link 210) of the body 210 of the second frame. In particular, the seating part 231 is provided to the second frame or the inner peripheral surface of the body 210 of the second frame and can be configured by a flange, which is extended to an internal direction of the seating part. As shown in the drawing, the seating part 231 is provided to each body (i.e., link 210) and can be contiguously extended among a length direction (L) of the second frame 200. In particular, the seating part 231 can stably support not only the display unit 15*a* but also the first frame 100.

Meanwhile, a clearance may exist between the first frame and the second frame, i.e., between sides of the first and the second frames. A foreign substance may be inserted into the inside of the wearable smart device 10 via the clearance and the device 10 may drive malfunction. Hence, as shown in FIGS. 2, 3, and 7, the wearable smart device 10 can further include a gasket 300 installed between the first frame 100 and the second frame 200. The gasket 300 can be arranged between a side of the first frame 100 extended or arranged along a length direction (L) of the device 100 and a side of the second frame 200 facing the side of the first frame 100 (i.e., between side walls 212 of the connected link 210). The gasket 300 is continuously extended between the sides of the first and the second frames and can be deployed to the both sides of the first and the second frames, respectively. The gasket 300 can be made of an elastic material. Hence, the gasket 300 can be closely attached to the first and the second frames 100/200. The gasket 300 can fill the clearance between the first frame and the second frame. In particular, the gasket 300 can prevent a foreign substance from entering into the inside of the device 100 via the clearance. And, the gasket 300 can also prevent the inside of the device 100 from being exposed to a user via the clearance.

More specifically, as shown in FIG. 7, the gasket 300 may have a body 310 arranged between a side of the first frame 100 and a side of the second frame 200 (i.e., a side wall of a link of the second frame) according to the aforementioned structural arrangement. The gasket, i.e., the body 310, can be simply installed between the first frame and the second frame without being contacted with the first and the second frames. Yet, preferably, the gasket 300, i.e., the body 310, can be contacted with at least one of the first frame and the second frame to close the clearance between the first frame and the second frame 100/200. The gasket 300, i.e., the body 310, may not be coupled with the first frame 100 and the second frame 200. In this case, the gasket may relatively move for both of the first frame and the second frame 100/200. Meanwhile, the gasket 300, i.e., the body 310, may be coupled with either the first frame 100 or the second frame 200. As mentioned in the foregoing description, since the first frame 100 is coupled with the display unit 15*a* corresponding to an important component, the gasket 300, i.e., the body 310, can be coupled with both the display unit 15*a* and the first frame 100 to protect the display unit 15*a*. Hence, the gasket 300, i.e., the body 310, may relatively move for the second frame 200 together with the first frame 100. FIG. 7 practically illustrates the gasket 300, i.e., the body 310, coupled with the first frame 100.

The gasket 300 can be configured to cover the first frame 100. More specifically, the gasket 300 can include a recess 320 formed on the body 310. The recess 320 can be extended in an inner direction of the body 310 from an inner side 330 of the body 310. The first frame 100, i.e., a side of the first frame 100, can be inserted into the recess 320. In particular, the first frame 100 can be covered by the gasket 300 while being coupled with the gasket 300 at the same time. The gasket 300 can be configured to cover the display unit 15*a*. More specifically, the gasket 300 can include the inner side 330 of the body 310 facing the display module 15*e* of the display unit 15*a*. In particular, the inner side 330 can support the module 15*e*, i.e., a side of the module. Meanwhile, as shown in the drawing, the window 15*f* of the display unit 15*a* can be configured to be larger than the module 15*e* to cover the module 15*e*. The gasket 300 can include a seating part 340 formed at the upper part of the body 310. The seating part 340 may correspond to the upper side of the gasket 300 or the body 310 of the gasket. Hence, the window 15*f* is put on the seating part 340 and can be supported by the seating part 340. Moreover, the gasket 300 can include a protrusion 350 provided to the upper part of the body 310. The protrusion 350 may correspond to a part relatively formed due to the formation of the seating part 340. The protrusion 350, i.e., an inner side of the protrusion, can support a side of the window 15*f*. In particular, the gasket 300 can support and cover the display unit 15*a*, i.e., sides of the module 15*e* and the window 15*f*, using the inner side 330, the seating part 340, and the protrusion 350. For this reason, the gasket 300 can sufficiently protect the display unit 15*a* corresponding to a sensitive part.

And, the gasket 300 can be put on the seating part 231 of the second frame 200 while being coupled with the display unit 15*a* and the first frame 100. Hence, even when the gasket 300 is deployed, the seating part 231 can stably support the display unit 15*a* and the first frame 100 together with the gasket 300. And, the gasket 300 can include an external side surface 360 facing a side wall 212 of the second frame 200 and a floor surface 370 facing the seating part 231 of the second frame 200. Since the gasket 300 moves together with the first frame 100 in a manner of being coupled with the first frame, the external side surface 360 and the floor surface 370 may form a bearing surface for the second frame 200. In particular, the gasket 300 can form a bearing surface for the second frame 200. If the first frame 100 is coupled with the second frame 200, the first frame may have the same bearing surface. In particular, the first frame 100 can smoothly perform a relative movement on the second frame 200 using the bearing surface formed by the gasket 300.

As discussed earlier in the foregoing description, when the first and the second frame 100/200 are deformed with big curvature, due to a considerable thickness (t) of an assembly of the first and the second frames, the deformed first frame 100 is arranged at a radial outermost surface (R) and a part of the second frame 200 is arranged at a radial innermost surface (R'). These arrangements different from each other may bring a curvature difference corresponding to a degree of deformation in the first and the second frames 100/200. Hence, in order to smoothly perform deformation and restoration, it is necessary to design the first and the second frames 100/200 in consideration of an amount of deformation or a difference of the degree of deformation. In FIG. 6, a geometrical mutual relation causing the aforementioned curvature difference is explained. The first and the second frames 100/200 are explained in more detail in the following with reference to FIG. 6 and other drawings to design the first and the second frames to solve the curvature difference or deformation amount difference.

First of all, FIG. 6 (a) is a schematic diagram for a first and a second frame 100/200 before the first and the second frame are deformed. More specifically, the first frame 100 can be simplified by a straight line arranged at an outermost surface (R) of an assembly of the first and the second frames 100/200. And, at least a part of the second frame 200, i.e., a bottom part corresponding to an outer peripheral surface of the frame assembly 100/200 can be simplified by a straight line arranged at a radial innermost surface (R'). As shown in the drawing, the first and the second frames 100/200 are configured by a same length before the first and the second frames 100/200 are deformed.

FIG. 6 (b) is a schematic diagram for the first and the second frames 100/200 deformed from a state of FIG. 6 (a). Due to a considerable thickness (t) of the frame assembly 100/200, the first and the second frames 100/200 may have curvature radiuses r1/r2 different from each other. Although the curvature radiuses r1/r2 may have origins different from each other, for clarity, FIG. 6 (b) shows a single origin (O). As shown in the drawing, a curvature radius (r2) of the second frame is shortened as much as a thickness (t) compared to a curvature radius (r1) of the first frame. Since curvature is inversely proportional to a curvature radius, curvature (C2) of the second frame considerably increases compared to curvature (C1) of the first frame. In particular, the first frame is recoverably deformed to have the first curvature (C1) and the second frame can be recoverably deformed to have the second curvature (C2) which is greater than the first curvature (C1). Hence, the second frame 200 can be more deformed compared to the first frame 100 due to the second curvature (C2). As shown in FIG. 6 (c), if the first and the second frames 100/200 are formed by a single body, the second frame 200, which should be deformed with the bigger curvature (C2), is bound by the first frame 100 deformed with the first curvature (C1). And, this phenomenon can also be explained by a difference between circumferences when the first and the second frames 100/200 are deformed. Since the curvature radius (r2) of the second frame 200 is smaller than the curvature radius (r1) of the first frame 100, if the frames 100/200 are deformed together with a prescribed angle of circumference, a circumference of the second frame 200 may become less than a circumference of the first frame 100 under an identical angle of circumference. In particular, if the first and the second frames 100/200 are formed by a single body, the circumference of the second frame 200 should be shortened to form a smooth curvature when the first and the second frames 100/200 are deformed. Hence, the second frame 200 receives pressure relatively higher than pressure received by the first frame 100. Hence, as shown in FIG. 6 (c), the second frame may be severely twisted. Since the second frame 200 is adjacent to a body of a user, the severe twist may interrupt comfortable wearing of the user. For this reason, as mentioned in the foregoing description, the first and the second frames 100/200 can be respectively made of members different from each other to prevent mutual interruption from being occurred between the first and the second frame when the first and the second frames are deformed.

Yet, if the first and the second frames 100/200 are completely separated from each other, the first and the second frames may not have sufficient structural strength and may be difficult to stably accommodate or support internal components. Hence, it is necessary to configure the first and the second frames 100/200 by separate members combined with each other. Yet, at the same time, the curvature (C1/C2) different from each other between the first and the second frames 100/200 and deformation difference due to the curvature should be solved for smooth deformation of the assembly of the first and the second frames 100/200. In particular, it may be required to have a coupling structure capable of allowing bigger curvature of the second frame 200, i.e., more deformation of the second frame without length reduction and relative pressure compared to the first frame 100. In relation to this, if the second frame 200 is able to relatively move without being bound to the first frame 100, the second frame 200 can be deformed to have geometrically required curvature (C2). For these reasons, the second frame 200 can be configured to be more deformed, i.e., the second frame 200 can be configured to have bigger curvature (C2) compared to the first frame 100 while being coupled with the first frame 100 at the same time. In particular, the second frame 200 can be configured to be movably coupled with the first frame 100. This coupling mechanism provides structural stability to the assembly of the first and the second frames 100/200 and enables smooth and stable deformation to be performed at the same time when a user wears the device 10. In the following, a coupling mechanism enabling movable coupling of the second frame 200 to be performed on the first frame 100 is explained in more detail with reference to related drawings.

Referring to FIG. 3 and FIG. 7, as a coupling mechanism, the first frame 100 can include at least one or more protrusions 120. The protrusions 120 can be provided to the first frame 100, i.e., a body 110 supporting the display unit 15a. Yet, as shown in the drawing, since the second frame 200 is arranged at the below of the first frame 100, the protrusions 120 can be provided to the floor surface of the first frame 100 to make the protrusions to be easily coupled with the second frame 200. And, as a coupling mechanism, the second frame 200 can include at least one or more slots 220. The protrusion 120 can be basically inserted into the slot 220. The slot 220 is formed on a floor surface 212 of the link 210 facing the floor surface of the first frame 100 to make the protrusion 120 to be easily inserted into the slot 220. Meanwhile, the protrusion 120 and the slot 220 can be arranged in the vicinity of sides of the first and the second frames 100/200. The protrusion 120 and the slot 220 can form a sufficient accommodation space in the second frame 200 without interrupting components accommodated in the second frame 200. As shown in FIG. 7, the slot 220 can be formed on a side of the second frame 200, i.e., a side wall 212 of the link 210. In order to make the protrusion 120 to be inserted into the slot 220, the protrusion 120 can be extended to the side, i.e., the side wall 212, of the second frame 200 from the first frame 100. More specifically, the protrusion 120 can include a first part 121 extended in down direction from the first frame 100 and a second part 122 extended toward the side wall 212 from the first part 121 and the second part inserted into the slot 220. The protrusion 120 is coupled with the slot 220 due to the insertion and the second frame 400 including the slot 220 can also be coupled with the first frame 100 connected with the protrusion 120. Since the protrusion 120 is extended along the length direction (L) of the first frame or the second frame 100/200, the protrusion 120 is movable in the length direction (L) along the slot 120. In particular, the first frame 100 and the protrusion 120 are movable in a manner of being guided by the slot 220. On the other hand, the second frame 200 and the slot 220 are movable in a manner of being guided by the protrusion 120 inserted into the slot. For this reason, the protrusion 120 and the slot 220 enable a relative movement between the first frame and the second frame 100/200. In particular, the second frame 200 can be coupled with the first frame in a movable manner using the protrusion 120 and the slot 220. For more stable relative movement and coupling between the first frame 100 and the second frame 200, a pair of protrusions 120 and a pair of slots 220 can be arranged at sides of the first frame and the second frame, respectively. And, for the same reason, a plurality of protrusions 120 and a plurality of slots 220 can be provided to the first and the second frames 100/200 and can be arranged according to the length direction (L) of the first and the second frames 100/200. In particular, the slot 220 can be formed according to each link 210. The first frame 100 may have a plurality of protrusions 120 inserted into each of a plurality of the slots 220. Moreover, in the drawing and the description, although the protrusion 120 and the slot 220 are provided to the first and the second frame 100/200, respectively, the protrusion 120 can be provided to the second frame 200 instead of the first frame 100 and the slot 220 can be provided to the first frame 100 instead of the second frame 200. Consequently, as a coupling mechanism of the first and the second frames 100/200, the wearable smart device 10 can include a slot provided to one of the first frame 100 and the second frame 200 and a protrusion provided to another one of the first frame 100 and the second frame 200 to couple with the slot. In this case, the protrusion can move according to the slot.

In order for a user to wear the wearable smart device 10, the user firstly deforms the device 10 as shown in FIG. 8. Deformation of the wearable smart device 10 can include deformation of the first and the second frame 100/200. Referring back to FIG. 6 (*b*), when the device is deformed to be worn on the user, first of all, the first frame 100 can be deformed to have first curvature (C1). In addition to the deformation of the first frame 100, the second frame 200 is also deformed with second curvature (C2). Due to geometric arrangement of the first and the second frames 100/200, since the second curvature (C2) is greater than the first curvature (C1), it is necessary to more deform the second frame 200 compared to the first frame 100. As mentioned in the foregoing description, the coupling mechanism including the protrusion 120 and the slot 220 can enable the relatively big deformation to be performed. More specifically, although the protrusion 120 is coupled with the slot 220, the protrusion 120 can freely move in the slot 220. Practically, the protrusion 120 can slide according to the slot 220 in the middle of deforming the device. The second frame 200 can be slidably coupled with the first frame 100 in the middle of deforming the device due to the movement of the protrusion 120 moving according to the slot 220. As shown in FIGS. 3 and 8, the protrusion 120 is positioned at a middle point (A1) of the slot 120 prior to deformation. When the device 10 is deformed, as shown in FIG. 8, the protrusion 120 can be positioned at one end (A2) of the slot 120. Hence, as shown in FIGS. 6 (*b*) and 8 using an arrow (M), the second frame 200 may relatively move as much as a distance between the points (A1 and A2), i.e., as much as a size of the arrow, for the first frame 100. And, as shown by an arrow direction (M), when the first frame and the second frame 100/200 are deformed together, the second frame 200 can more outwardly move in a length direction in response to the first frame 100. Consequently, the second frame 200 can be movably coupled with the first frame 100 by the coupling mechanism including the protrusion 120 and the slot 220. While the second frame 200 is deformed together with the first frame 100, the second frame 200 can relatively move in response to the first frame 100. It may be able to allow the second frame 200 to make relatively bigger deformation with bigger curvature (C2) without changing the relative moving length. Consequently, the second frame 200 can be deformed to have smooth second curvature (C2) without being bound to the first frame 100. The slot 121 and the protrusion 220, i.e., the coupling mechanism can combine the first and the second frame 100/200 with each other to stably accommodate and support internal components. At the same time, the coupling mechanism enables the second frame 200 to perform movable coupling and relative movement with the first frame 100. Hence, when the device 10 is deformed to be worn on a user, the coupling mechanism can enable the second frame 200 to form smooth curvature and a curved surface. Hence, the coupling mechanism can provide a structural stability to the assembly itself of the first and the second frame 100/200 and may be then able to provide comfortable wearing, which is resulted from smooth and stable deformation, to the user when the user wears the device 10. Moreover, when the device is worn on the user, the first and the second frames 100/200 can be easily deformed with curvature fitting to the user with the help of the aforementioned structural characteristics. By doing so, the user can conveniently use the device 10.

Meanwhile, referring back to FIG. 6 (*a*), a first and a second point (P1 and P2) included in the first frame 100 and a first and a second point (P1' and P2') included in the second frame 200 are arranged at identical vertical lines (L1 and L2), respectively, before the device is deformed. In particular, each of the points of the second frame 200 may have a relative position identical to each of the points of the first frame 100 before the device is deformed. Yet, as shown in FIG. 6 (*b*), if the device is deformed, the points (P1' and P2') of the second frame 200 can be separated or eccentric from the points (P1 and P2) of the first frame 100 in a vertical direction due to curvatures (C1 and C2) different from each other. And, due to a difference between first curvature (C1) and second curvature (C2), an angle of circumference ($\alpha$1) is increased to an angle of circumference ($\alpha$2). Hence, separation and eccentricity of the corresponding points (P1' and P2') of the second frame 200 are also increased for the points (P1 and P2) of the first frame 100. More specifically, as shown in the drawing, eccentricity of a point (P2, P2') separated from a center part may be greater than eccentricity of a point (P1, P1') adjacent to the center part in a length direction of the first and the second frame 100/200. In particular, as outwardly moving from the center part of the first and the second frame 100/200, the eccentricity can be gradually increased. Moreover, this means that a relative moving amount of the second frame 200 (or, slot 220) is gradually increased for the first frame 100 (or, protrusion 120) as getting far from the center part. If the slot 220 is designed without considering the difference of the eccentricity, a protrusion 220 separated from the center part of the second frame 220 may be bound by the slot 220 while the device is deformed. Hence, as outwardly moving from the center part of the first frame 100 or the second frame 200 in a length direction or as getting far from the center part, a size of the slot 220 can be gradually increased. In particular, a size of the slot 220 separated from the center part can be larger than a size of the slot 220 adjacent to the center part. On the other hand, the slot 220 can be designed to have a sufficient size in consideration of the eccentricity and the slot 220 can be identically applied to all links 210. The attached drawings show slots 220 having the identical sufficiently large size. According to the aforementioned configuration, the second frame 200 can more smoothly move compared to the first frame 100 and can be stably deformed with the second curvature.

As mentioned in the foregoing description, the second frame 200 can include a plurality of links 210 connected with each other. It may be able to control a total deformation amount or a deformation level according to an angle between adjacent links 210. And, if the deformation of the second frame 200 is controlled, since it also brings a deformation of the first frame 100 coupled with the second frame 200, it may also control a deformation of the device 10 having an appearance formed by the first and the second frames 100/200. In particular, the second frame 200 can control the deformation of the device 10 by controlling the deformation amount of the second frame. In order to control the deformation of the device 10 and the second frame, the second frame can control an angle between links 210. In particular, in order to control the deformation of the device 10 and the second frame, the second frame 200 can include a controlling mechanism configured to control an angle between links 210.

Figure 9:
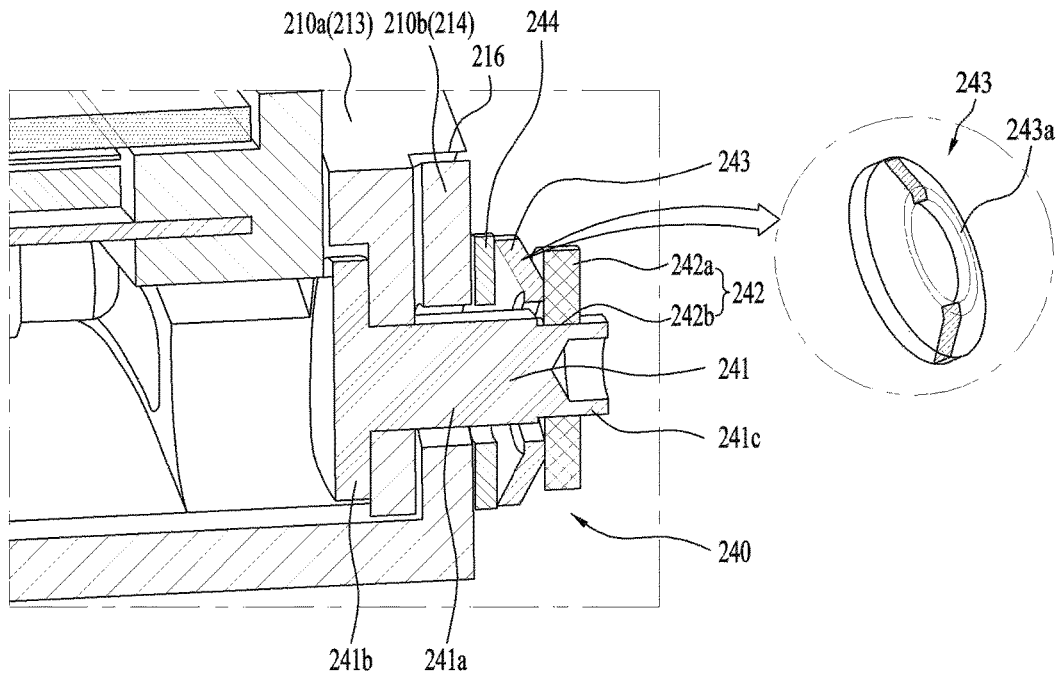
FIG. 9 is a cross section diagram for an example of a wearable smart device obtained according to C-C line shown in FIG. 3.
Figure 10:
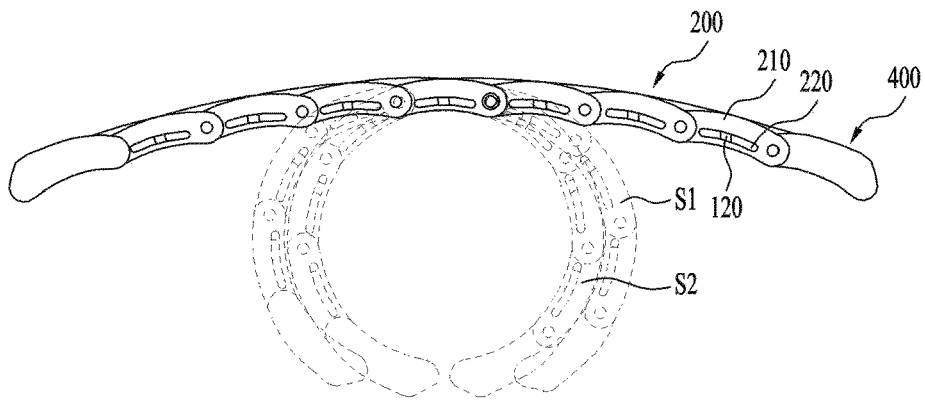
FIG. 10 is a side view diagram for an example of a wearable smart device deformed with a different size.

FIG. 9 is a cross section diagram for an example of a wearable smart device obtained according to C-C line shown in FIG. 3 and FIG. 10 is a side view diagram for an example of a wearable smart device deformed with a different size. A controlling mechanism is explained in detail with reference to FIGS. 9 and 10 in the following.

As shown in FIG. 9, the second frame 200 can include a hinge axis 241 connecting two adjacent links 210a/210b with each other as a controlling mechanism 240. The hinge axis 241 corresponds to a substitute for the general hinge axis 215 mentioned earlier with reference to FIG. 5 and may correspond to a member separately designed for the controlling mechanism 240. As shown in the drawing, the hinge axis 214 may have a body 214a having a shape of a bar or a rod in general. And, the hinge axis 214 has a head 214b formed at one end of the body 214a and can include a screw 214c formed at another end of the body. A first hinge 213 and a second hinge 214 of the links 210a/210b are overlapped for coupling and through tubes formed at the first and the second hinges 213/214 are aligned. The hinge axis 214 is inserted into the aligned through tubes to couple the links 210a/210b with each other. More specifically, the screw 214c protrudes to the outside of the links 210a/210b, i.e., the second frame 200, by penetrating the through tubes. The head 214b can be hung on the links 210a/201b, i.e., the first and the second hinges 213/214 of the links, to make the hinge axis 214 not to be separated from the links 210a/210b. And, the second frame 200 can include a first member 242 installed in the hinge axis 241 as the controlling mechanism 240. The first member 242 consists of a sort of nuts. In particular, the first member can include a hollow body 242a and a screw 242b formed on an inner peripheral surface of the body 242a. If the screw 242b of the first member 242 is coupled with the screw 241c of the hinge axis 241, the first member 242 can be installed in the hinge axis 241. And, the first member 242 may move to/from the links 210a/210b according to the screw 241c of the hinge axis 241 depending on a rotation direction of the first member 242. In particular, the first member 241 can move according to the hinge axis 241 or a center axis of the hinge axis.

And, the second frame 200 can include a second member 243 arranged at a connection part of the links 210a/210b as the controlling mechanism 240. In particular, the second member 243 can be arranged at a first and a second hinge 213/214 forming the connection part of the links 210a/210b or the hinge axis 241. And, the second member 243 can be made of a friction member or a friction disk. Hence, it may put a friction force on the hinges 213/214 corresponding to a part of the connection part, i.e., the links 210a/210b. In particular, the second member 243 may generate friction resistance between the second member 243 and the connection part while basically putting friction force on the connection part. More specifically, the second member 243 has a hollow body 243a made of elastic material and can be installed on the hinge axis 241 by inserting the hinge axis 241 into a through tube of the body 243a. The second member 243 can be arranged between the first member 242 and the connection part of the links 210a/210b. Hence, if the first member 242 moves toward the links 210a/210b while rotating, the first member 242 may put pressure on the second member 243. The second member 243 is deformed by the pressure and is closely attached to the connection part, i.e., links 210a/201b. In particular, it may be able to put friction force on the links 210a/210b. In general, if a contact area between the two members increases, friction force between the members increases as well. In particular, if the first member 242 moves toward the links 210a/201b and puts more power on the links, the second member 243 can be more deformed. Subsequently, the second member 243 can be more contacted with the connection part, i.e., the links 210a/210b, and the hinges 213/214 of the links and greater friction force can be put on the links and the hinges. In particular, the second member 243 has a different deformation amount depending on a size of external power and can be configured to put different friction force on the connection part according to the different deformation amount. And, it may be able to additionally install a washer 244 between the second member 243 and the connection part to more evenly put friction force on the connection part, i.e., links 210a/210b, or the hinges 213/214 of the links.

In order to gradually deform the device and control friction force according to the deformation of the device, as shown in FIG. 9, the second member 243 may have a body 243a inclined to the hinge axis 241. Specifically, a cross section of the second member 243 can be inclined to a central axis of the hinge axis 241. Due to the inclined orientation, the second member 243 can be configured by a disk having a body 243a inclined to the hinge axis 241. Due to the structure, if external power applied by the first member 241 increases, the amount of deformation and a contact area of the second member 243 can be easily increased to increase friction force.

When the controlling mechanism 240 is operated, if the links 210a/210b are arranged to have a prescribed angle, the second member 243 can be deformed to move the first member 242 toward the connection part and generate friction force. If the deformation amount and the friction force increase more than a prescribed amount, the links 210a/210b are unable to move due to the friction force applied to the links. Hence, the prescribed angle can be continuously maintained. If the first member 242 moves away from the connection part, the links 210a/201b can move due to the reduced friction force. Hence, the links 210a/210b are arranged again to have a different angle and the different angle can be maintained via a series of procedures identical to the aforementioned procedures. When the abovementioned operation is considered, the second frame 200 can be configured to control a friction amount at the connection part connecting the links 210a/210b using the controlling mechanism 240 to control an angle between the links 210a/210b and a deformation amount of the device.

Since it is able to control an angle between adjacent links 210a/210b connected with each other using the controlling mechanism 240, it may be able to control the entire angles formed by the links 210 as well. Since the links 210 form a body of the second frame 200, it may also be able to control the entire deformation amount or a deformation level by controlling the entire angles of the links 210. And, if the second frame 200 is deformed, the first frame 100 coupled with the second frame 200 is deformed as well. Hence, if the deformation amount of the second frame 200 is controlled, the deformation amount of the device 10 can be controlled as well. For example, as shown in FIG. 10, the second frame 200 can be deformed to a shape (S1) having a relatively less curvature for a user who has a thick wrist. Hence, the device 100 can also be deformed to the shape (S1). And, the second frame 200 can be deformed to a shape (S2) having a relatively bigger curvature for a user who has a thin wrist. Hence, the device 100 can also be deformed to the shape (S2). When an actual operation is considered, the second frame 200 can control not only the deformation amount of the second frame 200 but also the deformation amount of the device 100 by controlling an angle between the links using the controlling mechanism 240. As mentioned in the foregoing description, since it is able to easily perform the control of the deformation amount using the controlling mechanism 240, a user can conveniently use the device 10.

As mentioned in the foregoing description, in order to wear the device 10 on a body of a user or take off the device from the body of the user, the display unit 15a can be deformed with the first curvature (C1) together with the first frame 100 or can be restored from the deformation. In this case, sides of the display unit 15a can be protected by the second frame 200 or the gasket 300 in some degree when the display unit 15a is deformed or restored. On the contrary, both ends of the display unit 15a in length direction can be exposed to the external. Since the display unit 15a is structurally weak, both ends of the display unit can be damaged by various factors while the display unit is deformed or restored. In order to protect the both ends of the display unit 15a, as shown in FIGS. 2 to 4, the device 10 can further include a cover 400.

Figure 11:
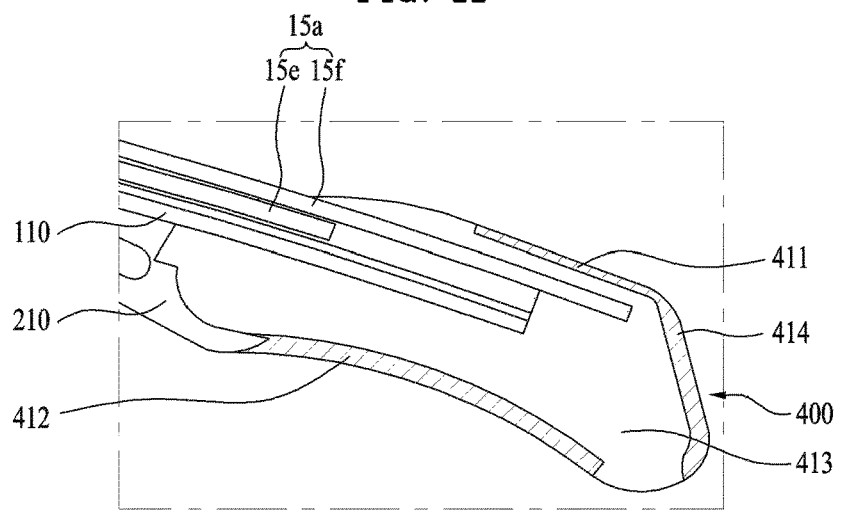
FIG. 11 are partial cross section diagrams illustrating an end part of a not deformed wearable smart device and an end part of a deformed wearable smart device, respectively.
Figure 11:
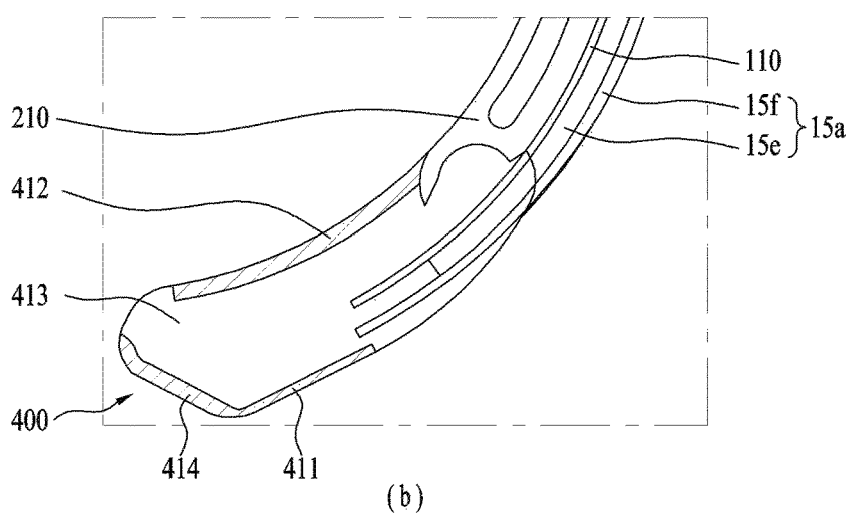
Figure 12:
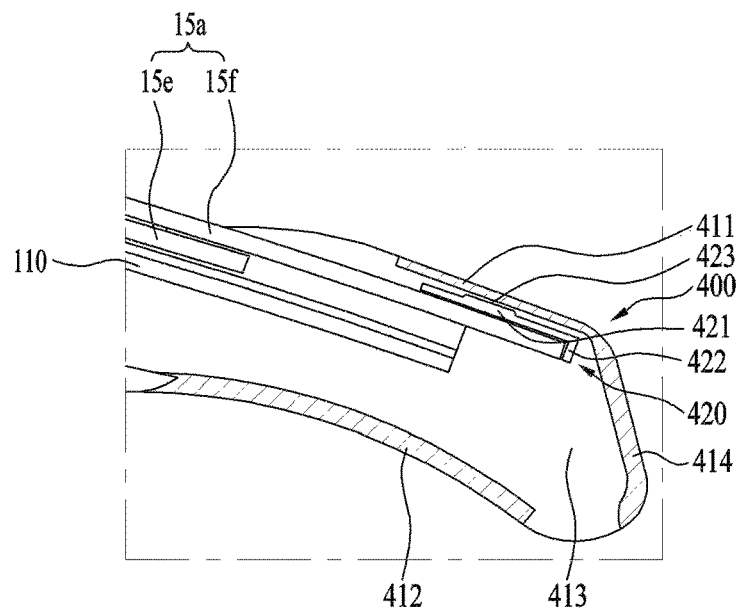
FIG. 12 is a partial cross section diagram illustrating an end part of a wearable smart device including a secondary cover.
Figure 13:
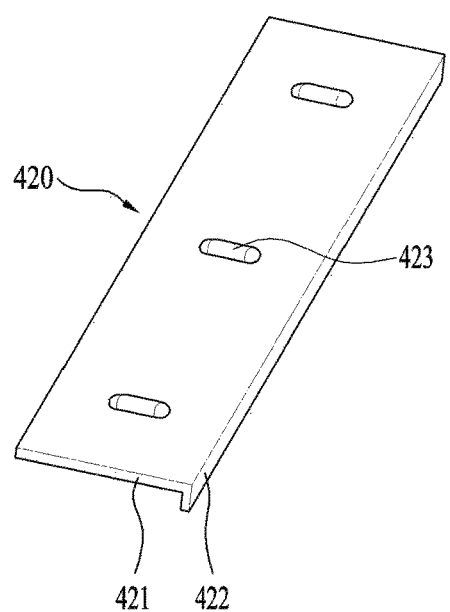
FIG. 13 is a perspective diagram illustrating the secondary cover shown in FIG. 12.

FIG. 11 is a partial cross section diagram illustrating an end part of a not deformed wearable smart device and an end part of a deformed wearable smart device, respectively. In particular, FIG. 11 (a) illustrates a cross section of a part A of FIG. 3 and FIG. 11 (b) illustrates a cross section of a part B of FIG. 8. FIG. 12 is a partial cross section diagram illustrating an end part of a wearable smart device including a secondary cover. FIG. 13 is a perspective diagram illustrating the secondary cover shown in FIG. 12. A cover 400 is explained in more detail in the following with reference to the drawings.

As shown in FIG. 2, the cover 400 can be installed in an end part of the second frame 200, i.e., a length direction (L) end part of the second frame, in response to a length direction (L) end part of the display unit 15a. The cover 400 can be coupled with the link 200 of the second frame 200 as an additional link to be recoverably deformed together with the second frame 200. In particular, the cover 400 can be pivotably coupled with the link 210 of the second frame 200 adjacent to the cover. And, the cover 400 can be configured to wrap an end part of the display unit 15a. More specifically, as shown in FIG. 11, the cover 400 can include a upper part wall 411, a bottom part wall, a side wall 413, and an end part wall 414. The walls 411-414 can wrap the end part of the display unit 15a. As shown in FIG. 11 (a), the end part of the display unit 15a can be arranged at the inside of the cover 400 even before the device 10 is deformed. As shown in FIG. 11 (b), the end part of the display unit 15a can be arranged at the inside of the cover 400 even after the device 10 is deformed. In particular, as shown in the drawing, the window 15f of the display unit 15a can be configured to be longer than the display module 15e in length direction to protect the display module 15e. Hence, the cover 400 can be designed in consideration of a length of the window 15f not to make the cover interrupt the window 15f when deformation or restoration is performed. Hence, the end part of the display unit 15a is protected by the cover 400 and the cover 400 prevents the damage of the display unit 15a.

As mentioned in the foregoing description, in order to smoothly deform the device 10, it is necessary for the display unit 15a and the first frame 100 to relatively move for the second frame 200. Hence, the cover 400 combined with the second frame 200 may not set a limit on the display unit 15a or may not catch the display unit 15a to allow the display unit 15a to move. Meanwhile, if a clearance occurs between the end part of the display unit 15a and the cover 400 (i.e., the upper part wall 411 of the cover), a foreign substance may enter the clearance and the device is unable to have a good appearance. Hence, the end part of the display unit 15a can be tightly attached to the cover, i.e., the inside of the upper part wall 411 of the cover. And, it is necessary for the end part of the display unit 15a to relatively move for the second frame 200. Hence, in order to maintain the attachment between the cover 400 and the end part during the relative movement, the cover 400 can be configured to allow the end part of the display unit 15a to slide in the cover 400, i.e., in the inside of the cover 400. More specifically, as shown in FIG. 11, the inside of the upper part wall 411 of the cover 400 is formed by a bearing surface and the end part of the display unit 15a can slide on the bearing surface. Due to the slide movement, the end part of the display unit 15a can smoothly move while being tightly attached to the cover 400.

Meanwhile, if the slide movement is repeated, the end part of the display unit 15a, i.e., an end part of the window 15f contacted with the cover 400, can be damaged due to the repeated friction. In order to protect the end part of the display unit 15a from the damage, as shown in FIG. 12, a secondary cover 420 can be additionally applied to the cover 400. The secondary cover 420 can be arranged between the cover 400, i.e., the upper part wall 411 of the cover 400 and the end part of the display unit 15a. The secondary cover 420 can be installed in the display unit 15a, i.e., an upper part of the window 15f, corresponding to a part where the end part of the display unit 15a and the cover 400 are contacted. The secondary cover 420 can slide on the cover 400, i.e., the inside of the upper part wall 411 of the cover 400, together with the end part of the display unit 15a while the wearable smart device 10 is deformed or restored. When the secondary cover 420 slides, the secondary cover 420 can be directly contacted with the cover 400, i.e., the inside of the upper part wall 411, on behalf of the end part of the display unit 15a. Hence, the end part of the display unit 15a can repeatedly move in the cover 400 without being damaged by the friction with the help of the secondary cover 420.

More specifically, as shown in FIG. 13, the secondary cover 420 may have a body 421 arranged at an upper surface of the end part of the display unit 15a facing the cover 400, i.e., the upper part wall 411. The body 421 can be continuously extended over both ends of the end part to entirely wrap the end part of the display unit 15a. The secondary cover 420 may have a flange 422 arranged at the end of the display unit 15a facing the end part wall 414 of the cover 400. The flange 422 is extended from the body 421 and can protect the end part of the display unit 15a from the cover 400. Moreover, the secondary cover 420 can include a protrusion 423 protruded from the body 421. More specifically, the protrusion 423 is protruded from an upper surface of the body 421 and can be directly contacted with the upper part wall 411 of the cover 400 on behalf of the body 421. Hence, a contact area between the secondary cover 420 and the cover 400 can be considerably reduced using the protrusion 423. As a result, the end part of the display unit 15a can more smoothly move.

Figure 14:
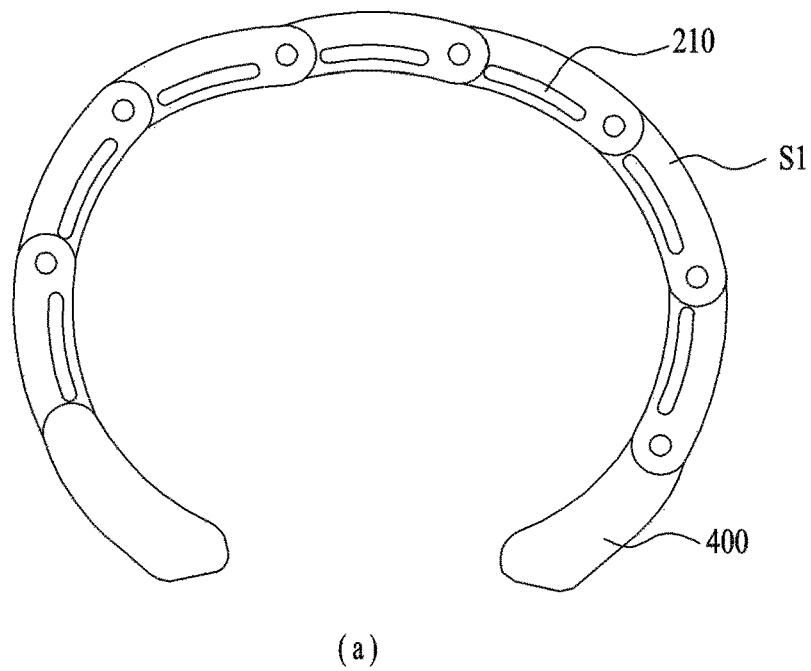
FIG. 14 is a side view diagram for an example of a wearable smart device including a filler.
Figure 14:
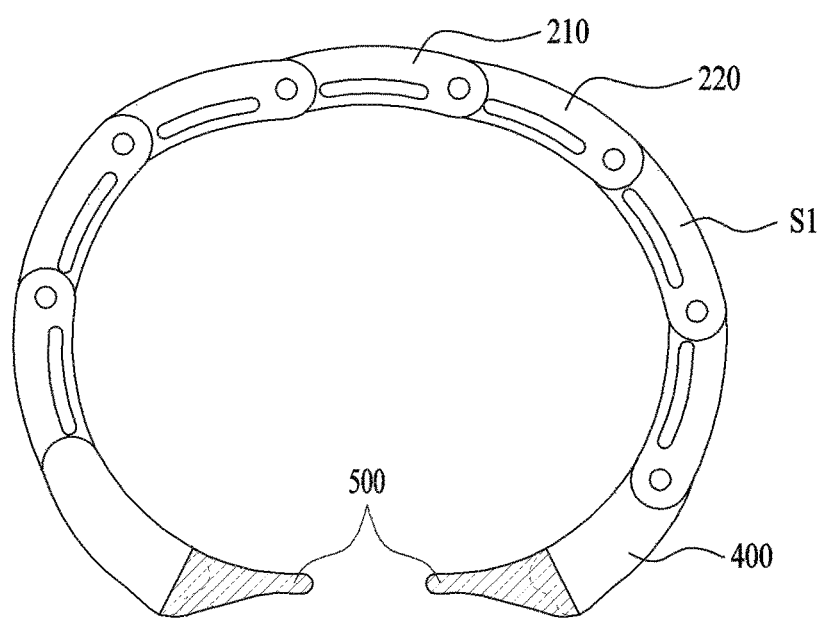

As mentioned earlier with reference to FIGS. 9 and 10, the second frame 200 can control not only the deformation amount of the second frame but also the deformation amount of the device 10 using the controlling mechanism 240. Hence, the device 10 may have various shapes (S1 and S2) having a different curvature in accordance with a wrist of a user. Yet, a length of the device 10 is constant and the length is not changed by the deformation of the device. In particular, as shown in FIG. 10 and FIG. 14 (a), if the device is deformed to a shape (S1) having a less curvature for a big wrist, both ends of the device 10 can be considerably separated from each other and the device 10 can be unstably worn on the wrist of the user. For this reason, when the wearable smart device 10 is deformed, the device 10 can include a filler 500 which is installed in at least one of both ends facing each other. More specifically, the filler 500 can be installed in one end of the second frame 200. If the device 10 includes the cover 400, the filler 500 can be installed in an end of the cover 400. And, the filler 500 can be installed in an end of the device 10 in a detachable manner. Hence, as shown in FIG. 14 (a), if the device 10 is deformed with a relatively less curvature, a user can install the filler 500 in one of both ends of the deformed device 10. On the other hand, as shown in FIG. 10, if the device is deformed to a shape (S2) having a big curvature, both ends of the device 100 are closely positioned. Hence, a user may not install the filler 500 in the ends of the device 10 or may detach previously installed fillers 500 from the ends of the device 10. The filler 500 fills an interval or a space between the both ends of the deformed device 10 and may bring a result of practically extending a length of the device 10. As a result, the deformed device 10 can entirely wrap a wrist of a user and can be stably worn on the wrist of the user. For more stable and balanced wearing, as shown in FIG. 14 (b), the fillers 500 can be installed in both ends of the deformed device 10 in a detachable manner.

Figure 15:
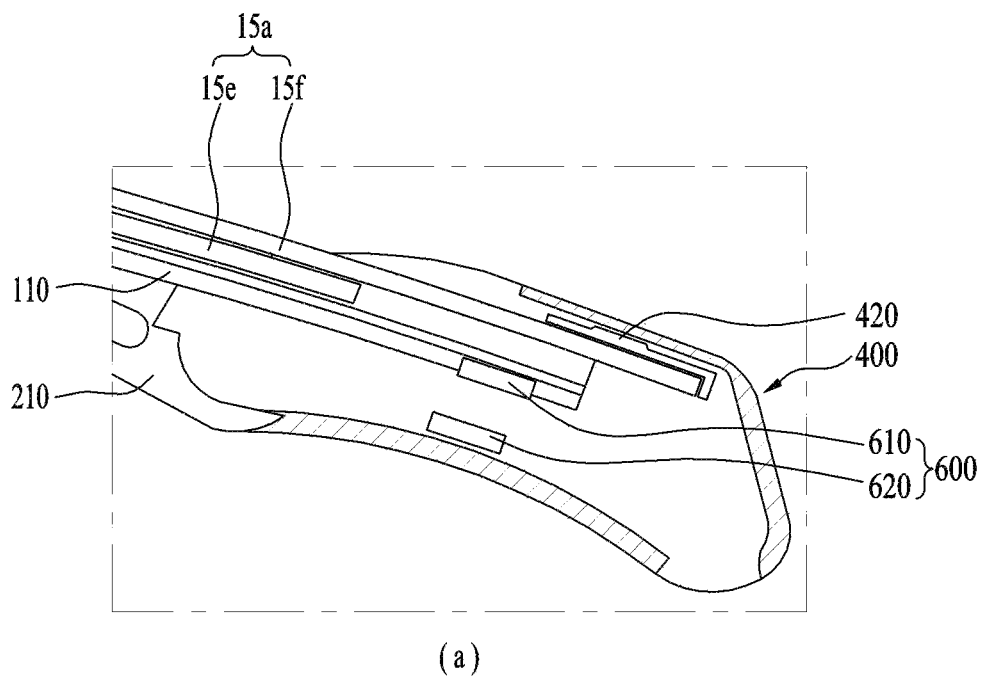
FIG. 15 is a partial cross section diagram illustrating an example of a wearable smart device including a sensor.
Figure 15:
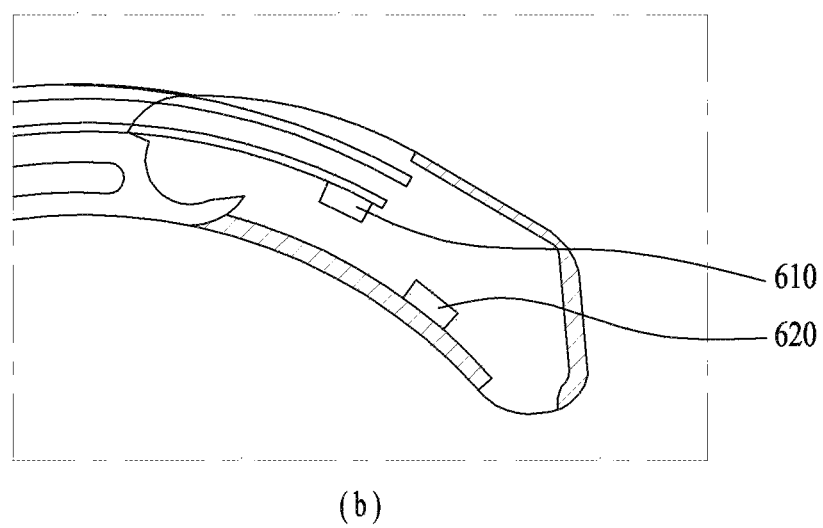

As shown in FIG. 15, the device 10 can further include a mechanism 600 configured to sense a deformation. It may use various sensors for the sensing mechanism 600. Yet, as shown in the drawing, a hall sensor having a simple structure can be applied to the device 10. The sensing mechanism 600 can include a magnetic 610 installed in one of the first frame 100 and the second frame 200 and a hall sensor 620 installed in another one among the first frame 100 and the second frame 200. Referring to the example shown in FIG. 15, the magnetic 610 is installed in the first frame 100 and the hall sensor 620 is installed in the cover 400 added to the second frame 200. Yet, the hall sensor can be directly installed in the second frame 200 rather than the cover 400. Meanwhile, the magnetic 610 can be installed in the second frame 100 or the cover 400 rather than the first frame 100 and the hall sensor 620 can be installed in the first frame 100 rather than the second frame or the cover 400. The hall sensor 620 is configured to sense strength of a surrounding magnetic field and a change of the strength. As shown in FIG. 15 (a), when the device 10 is not deformed, the hall sensor 620 and the magnetic 610 can be basically arranged to be adjacent to each other. Due to the adjacent magnetic 610, the hall sensor 620 can sense a strong magnetic field and the controller 18 can detect the magnetic 610 arranged in the vicinity of the controller using the sensed magnetic field. As mentioned in the foregoing description, since the hall sensor 620 and the magnetic 610 are arranged in a manner of being adjacent to each other when the device 10 is not deformed, the controller 18 can determine that the device 10 is not deformed by detecting the adjacent magnetic 610. Meanwhile, if the device 10 is deformed, as shown in FIG. 15 (b), the second frame 200 and the cover 400 coupled with the second frame can more outwardly move in length direction compared to the first frame 100 and the magnetic 610 becomes far from the hall sensor 620. The sensor 620 can sense a relatively weak magnetic field due to the magnetic 610 away from the sensor. The controller 18 can detect that the magnetic 610 is separated from the sensor 620 based on the sensed magnetic field. When the device 10 is deformed, since the sensor 620 is separated from the magnetic 610, the controller 18 can determine that the device 10 is deformed by detecting the separated magnetic 610. The sensing mechanism 600 can sense deformation and non-deformation of the device 10 based on the aforementioned procedures and can control an operation of the device 10 using a sensed result. For example, the device 10 can provide functions different from each other and an interface therefor for the deformation and the non-deformation.

Figure 16:
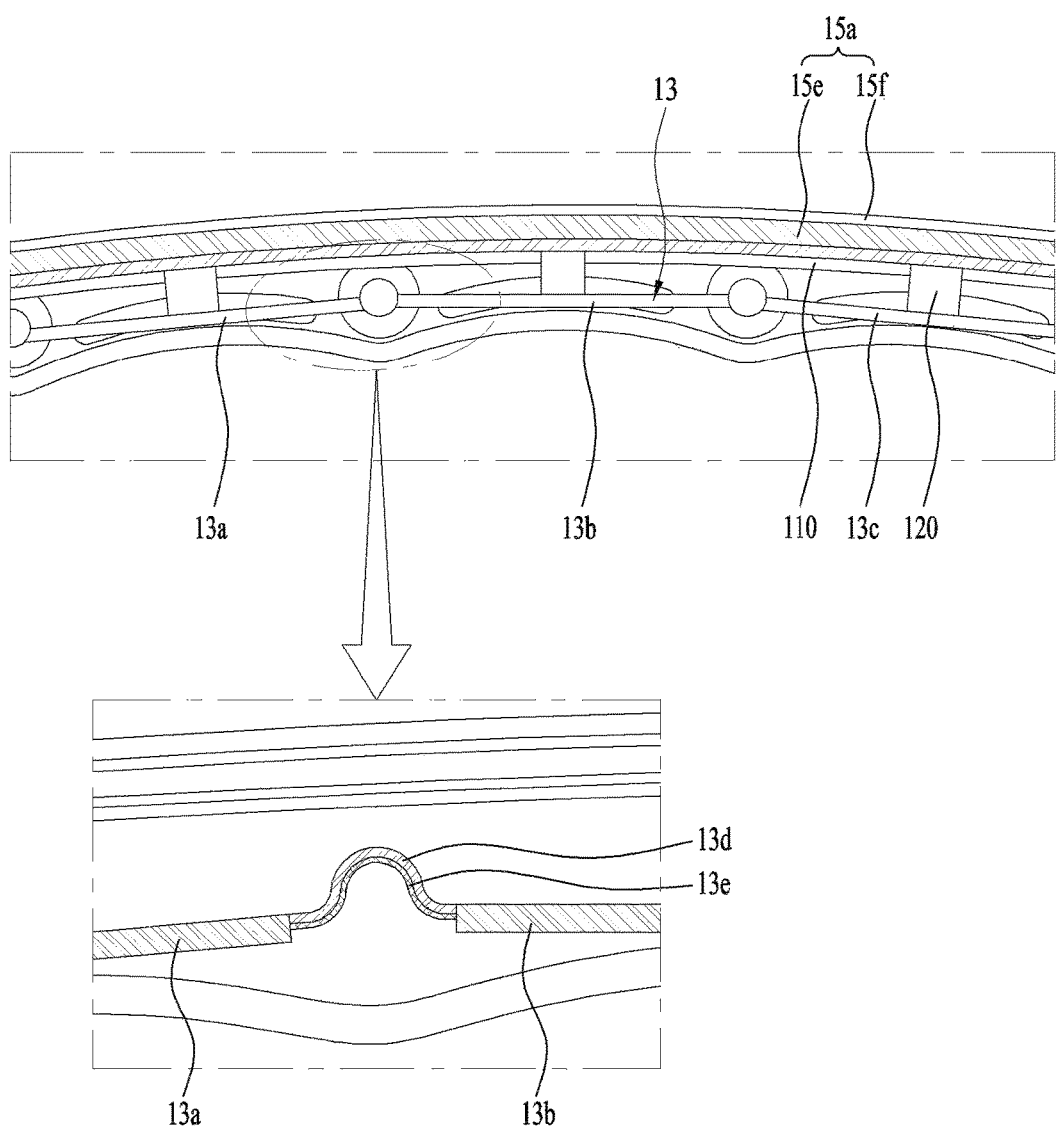
FIG. 16 is a cross section diagram illustrating an example of a board installed in a wearable smart device.

As mentioned in the foregoing description, the wearable smart device 10 can include components incapable of being manufactured by a transformable material and the board 13 can be included in the components. More specifically, since it is necessary to install the considerable number of electronic parts in the board 13, the board 13 should have considerable strength. Hence, it is difficult to manufacture the board 13 with a flexible material. Instead, it is necessary to manufacture the board 13 with a stiff or rigid material. Since it is difficult to deform the board 13, the board 13 can be divided into a plurality of parts. The divided board 13 is configured to have a length not interrupted with the frames 100/200 when the device 10 is deformed. In particular, as mentioned with reference to FIG. 5, the link 210 of the second frame can form a prescribed internal space. Since the second frame 200 is deformed by a pivot for a different link 210 adjacent to a link 210, no deformation can be applied to the link itself and an internal space of the link. Hence, the board 13 can be divided into a plurality of parts 13a, 13b, and 13c having a size of the link 210, i.e., a size matched with a size of the internal space of the link. Each of a plurality of the parts can be arranged at the inside of the links 210. For example, FIG. 16 illustrates a divided board 13. Yet, in order to make other parts of the device 10 not to be affected by a deformation, the board can be designed to have a size of the link 210 or a size corresponding to the size of the internal space of the link. A plurality of the parts 13a, 13b, and 13c of the board 13 can be electronically connected with a transformable flexible board (FPCB (flexible printed circuit board)) 13d. The flexible board 13d is arranged at the connection part of the links 210 and can be deformed together with the device 10 when the device is deformed. If the flexible board is repeatedly deformed, fatigue and damage may occur on the flexible board 13*d*. Hence, a reinforcing member 13*e* can be attached to the flexible board 13*d*. The reinforcing member 13*e* can be made of a transformable flexible material as well. For example, fabric, paper, and the like can be used as the reinforcing member 13*e*. The flexible board 13*d* can be reinforced by the reinforcing member 13*e* and may have a long service life under the repetitive deformation.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A wearable smart device, comprising:
 a flexible display unit;
 a first frame configured to support the flexible display unit, the first frame being configured to be recoverably deformed to have first curvature to be worn on a body of a user; and
 a second frame configured to be recoverably deformed to have a second curvature greater than the first curvature, the second frame being configured to be movably coupled with the first frame to relatively move with respect to the first frame while being deformed,
 wherein the second frame is configured to control an amount of deformation of the wearable smart device, and
 wherein the second frame is configured to form a space to accommodate components for driving the wearable smart device.

2. The wearable smart device of claim 1, wherein the flexible display unit is configured to be attached to the first frame and is configured to be recoverably deformed with the first curvature together with the first frame, and
 wherein the first frame is configured by a body of a long plate shape.

3. The wearable smart device of claim 1,
 wherein the second frame is arranged at a position closer to the user compared to the first frame, and
 wherein the second frame is arranged at the below of the first frame.

4. The wearable smart device of claim 1, wherein the second frame is slidably coupled with the first frame.

5. The wearable smart device of claim 1, wherein the second frame more outwardly moves in a length direction compared to the first frame while being deformed.

6. The wearable smart device of claim 1, further comprising:
 a slot provided to one of the first frame and the second frame; and
 a protrusion provided to another one of the first frame and the second frame to be coupled with the slot and the protrusion capable of moving along the slot.

7. The wearable smart device of claim 1, wherein an amount of deformation of the second frame is configured to be controlled to control the amount of deformation of the wearable smart device.

8. The wearable smart device of claim 1, wherein the second frame comprises a plurality of links connected with each other.

9. The wearable smart device of claim 8, wherein the second frame is configured to control an angle between the links to control the amount of deformation of the wearable smart device.

10. The wearable smart device of claim 9, wherein the second frame is configured to control an amount of friction at a connection part of the links to control the angle between the links.

11. The wearable smart device of claim 8, wherein the second frame is arranged at a connection part that connects a pair of links adjacent to each other among the plurality of links and comprises a friction member to apply friction force to the connection part.

12. The wearable smart device of claim 11, wherein the friction member applies a different friction force to the connection part while being deformed with a different size according to an amount of external force.

13. The wearable smart device of claim 8, wherein the second frame comprises:
 a hinge axis configured to connect links adjacent to each other among the plurality of links;
 a first member configured to be movably installed according to a center of the hinge axis; and
 a second member configured to apply friction force to the links in a manner of being elastically deformed by the first member while the first member is moving.

14. The wearable smart device of claim 1, further comprising a gasket configured to fill a clearance between the first frame and the second frame in a manner of being installed between the first frame and the second frame.

15. The wearable smart device of claim 14, wherein the gasket is arranged between a side of the first frame and a side of the second frame facing the first frame and is configured to cover a side of the display unit installed on the first frame.

16. The wearable smart device of claim 1, further comprising a cover installed in an end part of the second frame, the cover being configured to wrap an end part of the display unit.

17. The wearable smart device of claim 16, wherein the cover is configured to make the end part of the display unit slide on the cover.

18. The wearable smart device of claim 16, further comprising a secondary cover installed between the cover and the end part of the display unit, the secondary cover being configured to slide on the cover together with the end part of the display unit while the wearable smart device is deformed.

19. The wearable smart device of claim 1, further comprising a sensing mechanism configured to sense the deformation of the wearable smart device.

20. The wearable smart device of claim 1, further comprising a filler installed in one of both ends of the wearable smart device facing each other when the wearable smart device is deformed, the filler being configured to fill a gap between the both ends.

* * * * *